United States Patent
Saruwatari

[19]

[11] Patent Number: 5,892,609
[45] Date of Patent: Apr. 6, 1999

[54] DIGITAL SIGNAL RECEIVER CIRCUIT

[75] Inventor: Eiji Saruwatari, Tokyo, Japan

[73] Assignee: Kabushiki Kaisha Toshiba, Kawasaki, Japan

[21] Appl. No.: 862,297

[22] Filed: May 22, 1997

[30] Foreign Application Priority Data

May 24, 1996 [JP] Japan ..................................... 8-130233
May 20, 1997 [JP] Japan ..................................... 9-129192

[51] Int. Cl.$^6$ .................................................. H04B 10/06
[52] U.S. Cl. ..................... 359/189; 250/214 A; 330/59; 330/308; 375/318
[58] Field of Search ...................... 359/189; 250/214 A; 375/318; 330/59, 308

[56] References Cited

U.S. PATENT DOCUMENTS 5,025,456   6/1991   Ota et al. ................................. 375/318
5,612,810   3/1997   Inami et al. ............................. 359/189

FOREIGN PATENT DOCUMENTS 0 117 625   9/1984   European Pat. Off. .
0 489 927   6/1992   European Pat. Off. .
29 05 904   8/1980   Germany .

OTHER PUBLICATIONS

Makoto Nakamura, et al., Custom Integrated Circuits Conference, No. CONF. 16, pp. 629–632, 1994, "A Wide–Dynamic–Range and Extremely High–Sensitivity CMOS Optical Receiver IC Using Feed–Forward Auto–Bias Adjustment".

Charles A. Eldering, Journal of Lightwave Technology, vol. 11, No. 12, pp. 2145–2149, Dec. 1993, "Theoretical Determination of Sensitivity Penalty for Burst Mode Fiber Optic Receivers".

Primary Examiner—Kinfe-Michael Negash
Attorney, Agent, or Firm—Oblon, Spivak, McClelland, Maier, & Neustadt, P.C.

[57] ABSTRACT

An optical signal is converted by a light-receiving element into a photoelectric current. The photoelectric current is converted by a preamplifier into a positive phase voltage and the opposite phase voltage. The peaks of the positive phase output and opposite phase output are sensed and held by a first and second peak sensing circuits. The median between the output of the second peak sensing circuit and the positive phase output of the preamplifier is determined by a first median output circuit. The median between the output of the first peak sensing circuit and the opposite phase output of the preamplifier is determined by a second median output circuit. A level comparison circuit compares the outputs of the first and second median output circuits and produces a signal voltage with a constant amplitude within a specific input voltage range, thereby producing a reception signal. This helps alleviate duty fluctuations and the deterioration of the reception sensitivity resulting from the dark current of the light-receiving element or fluctuations in the output offset voltage of the preamplifier.

33 Claims, 24 Drawing Sheets

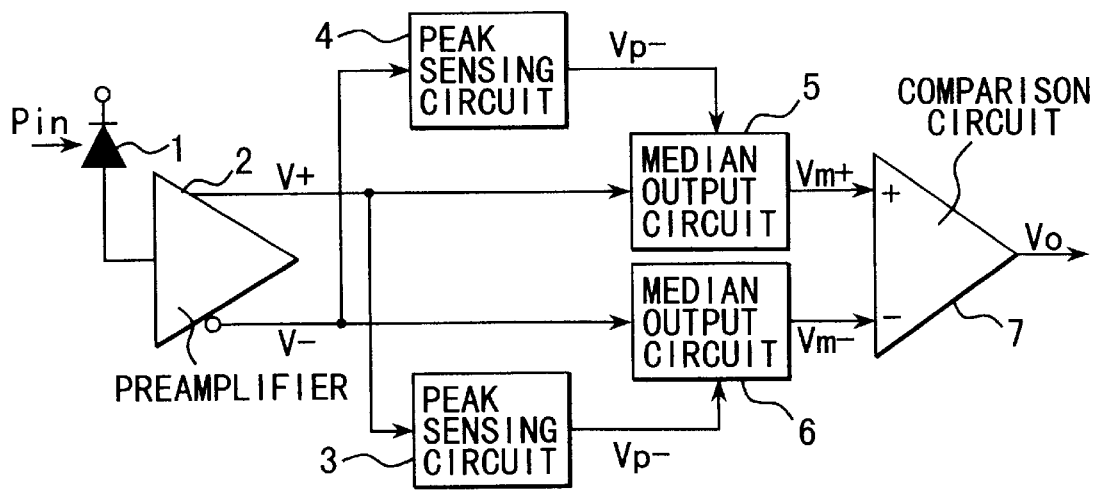
F I G. 2

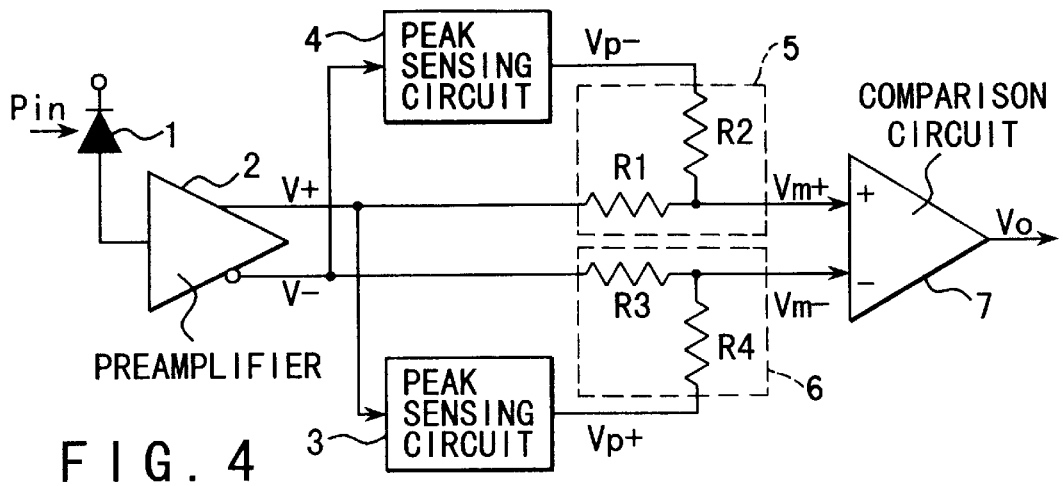
F I G. 4
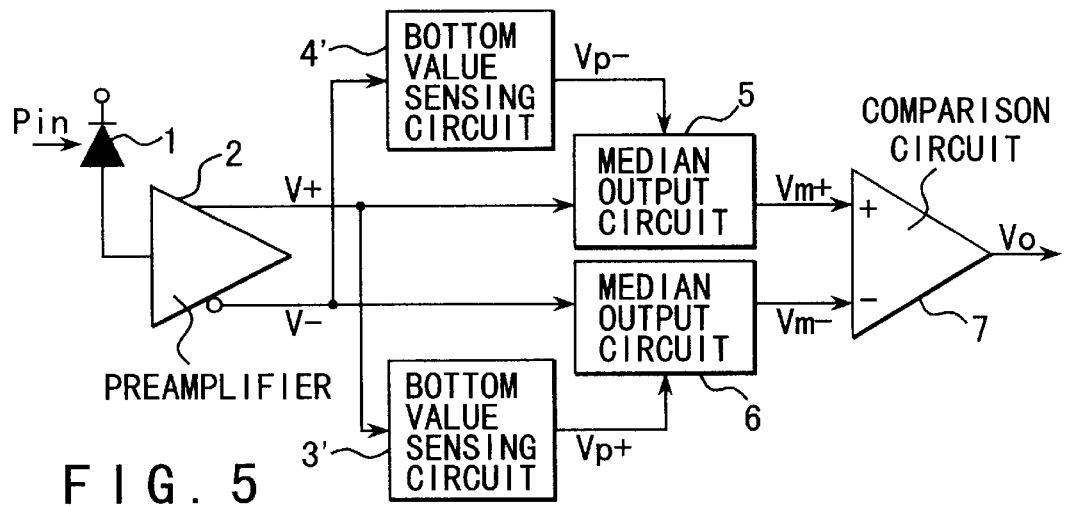
F I G. 5
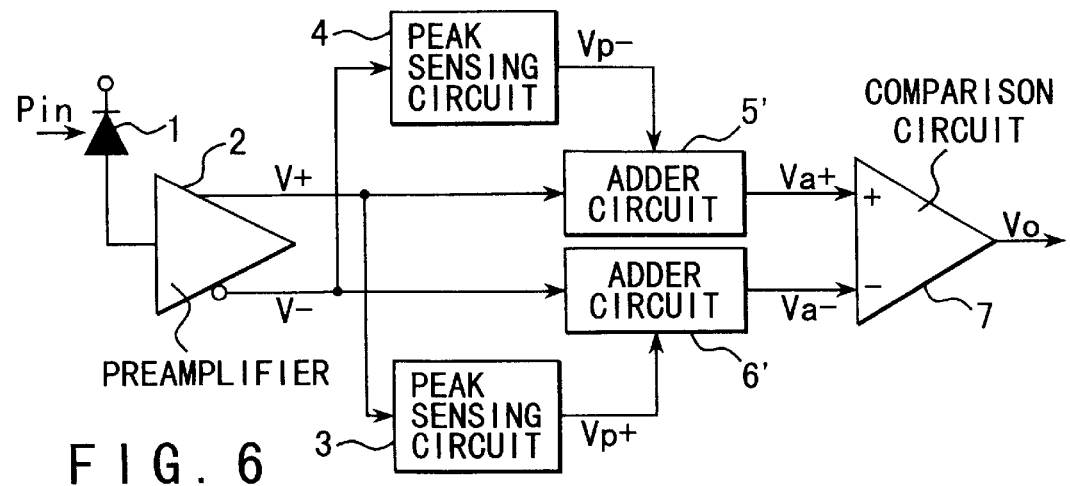
F I G. 6

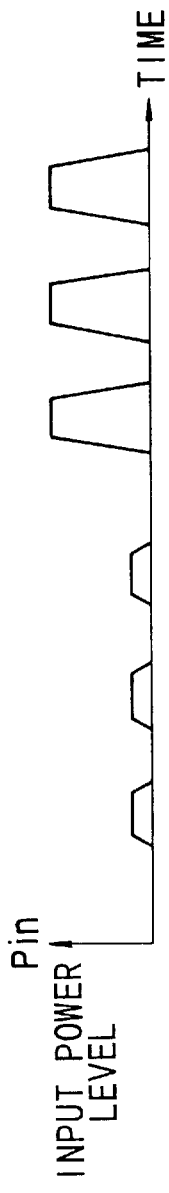
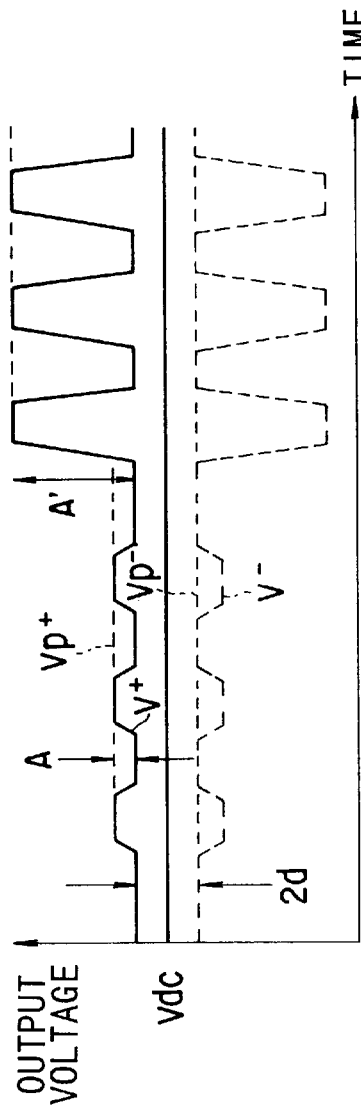
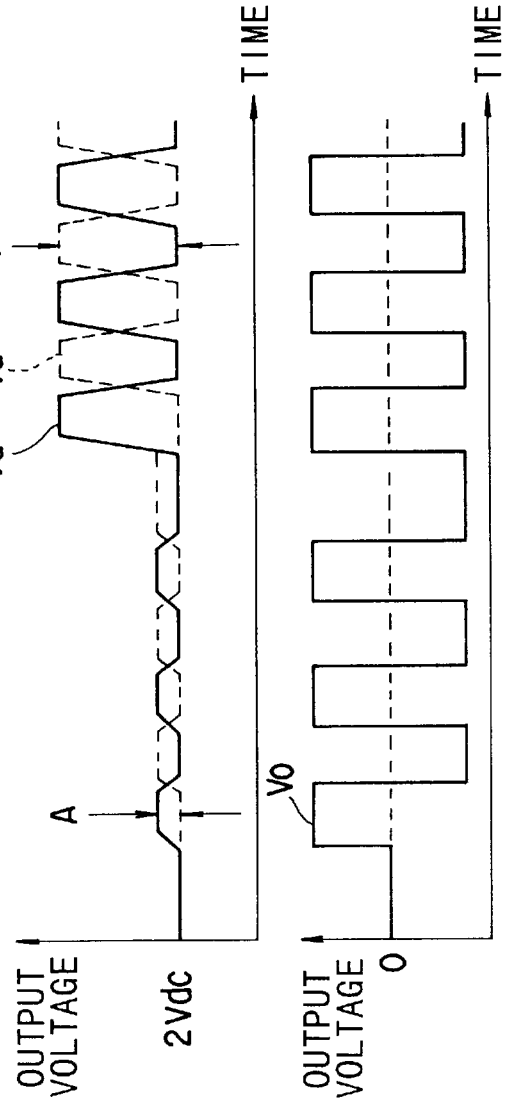
F I G. 7A
F I G. 7B
F I G. 7C
F I G. 7D

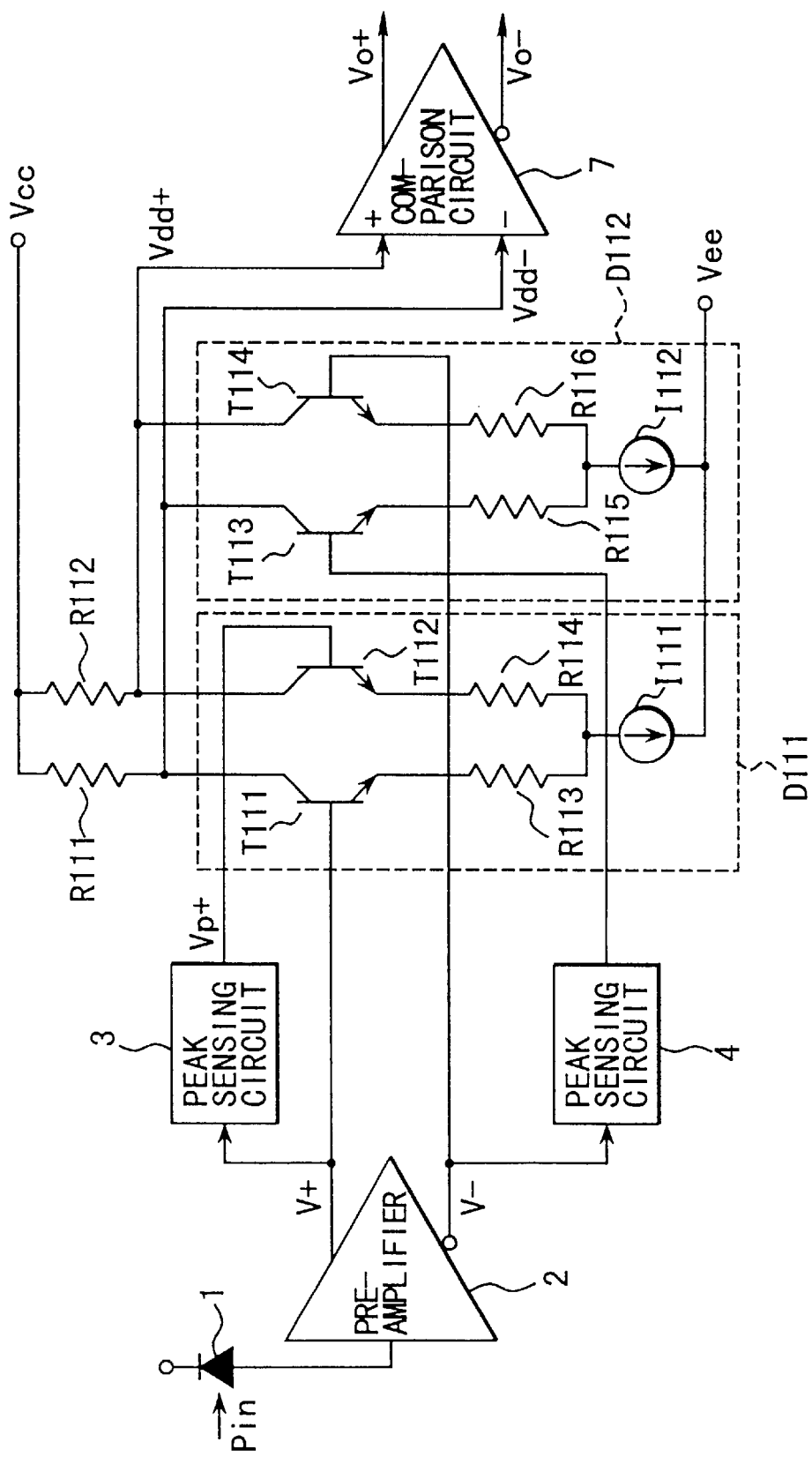
F I G. 9

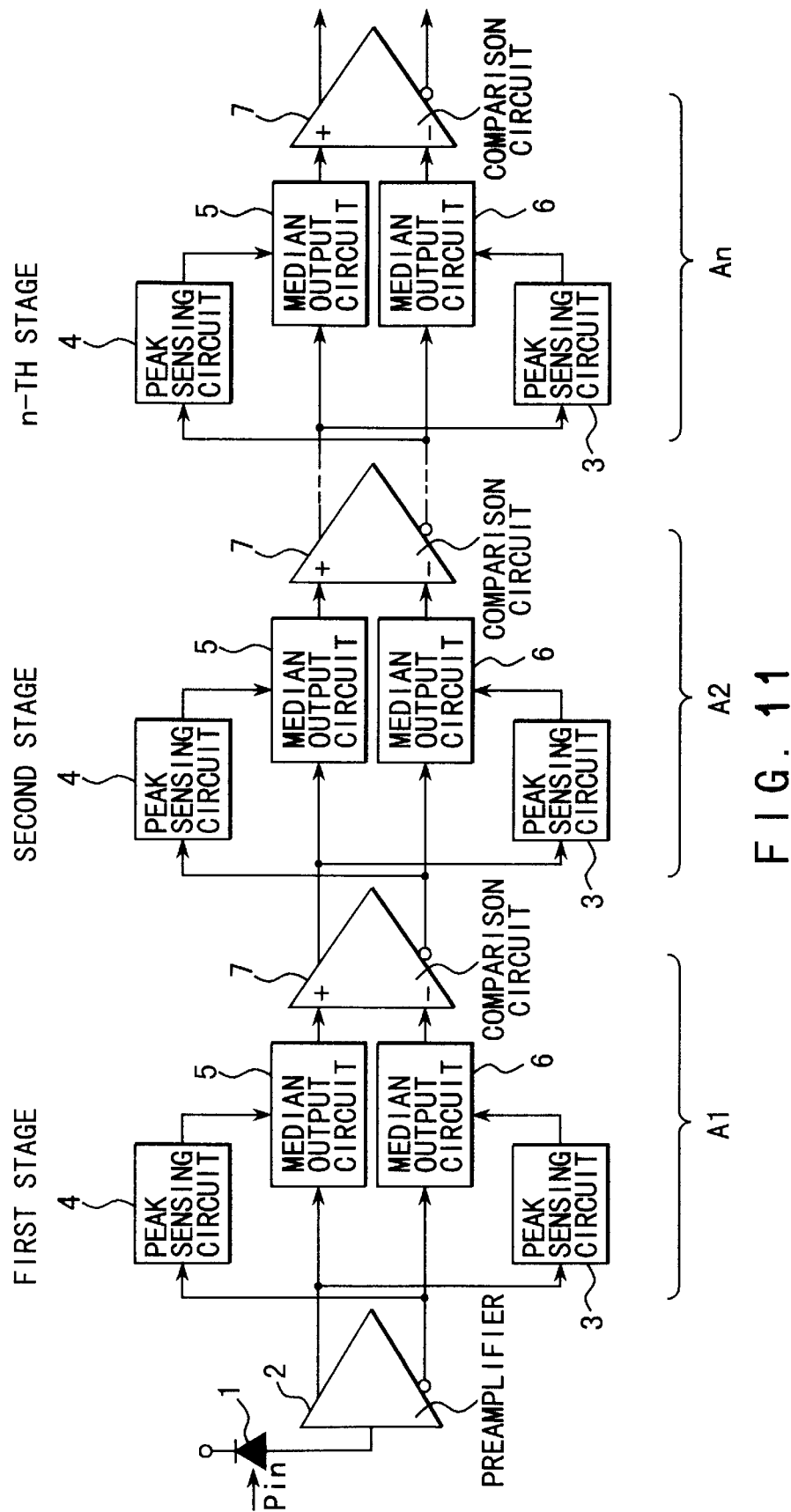
F I G. 11

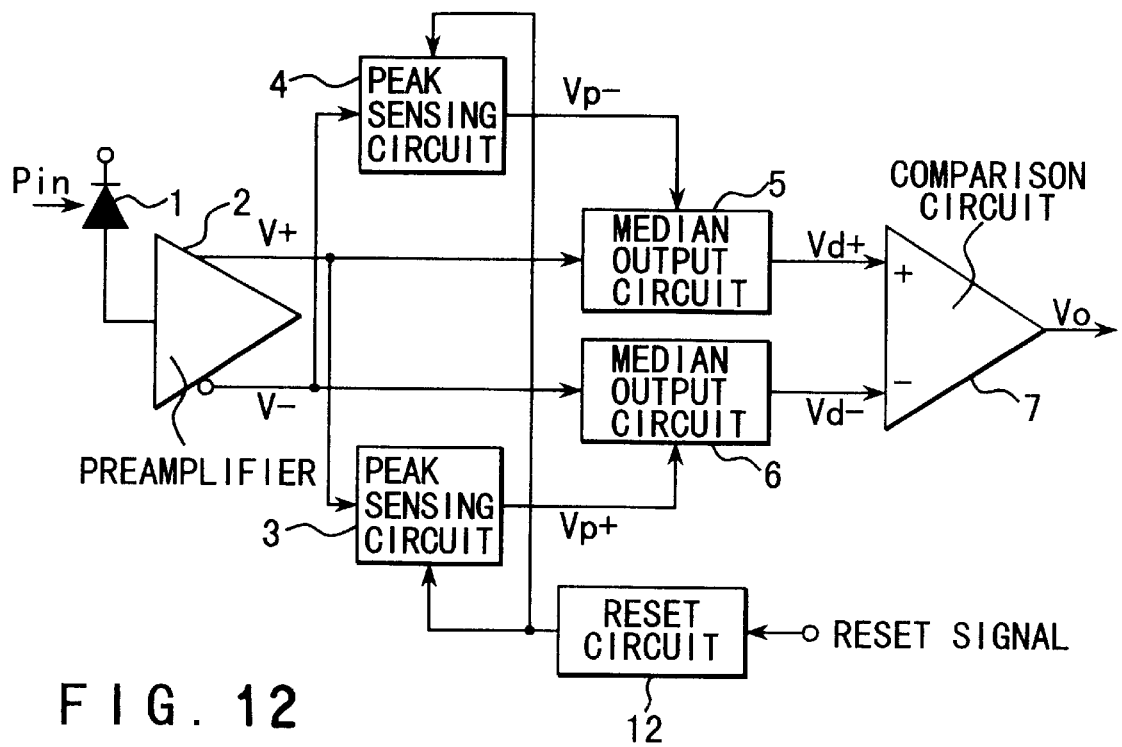
F I G. 12
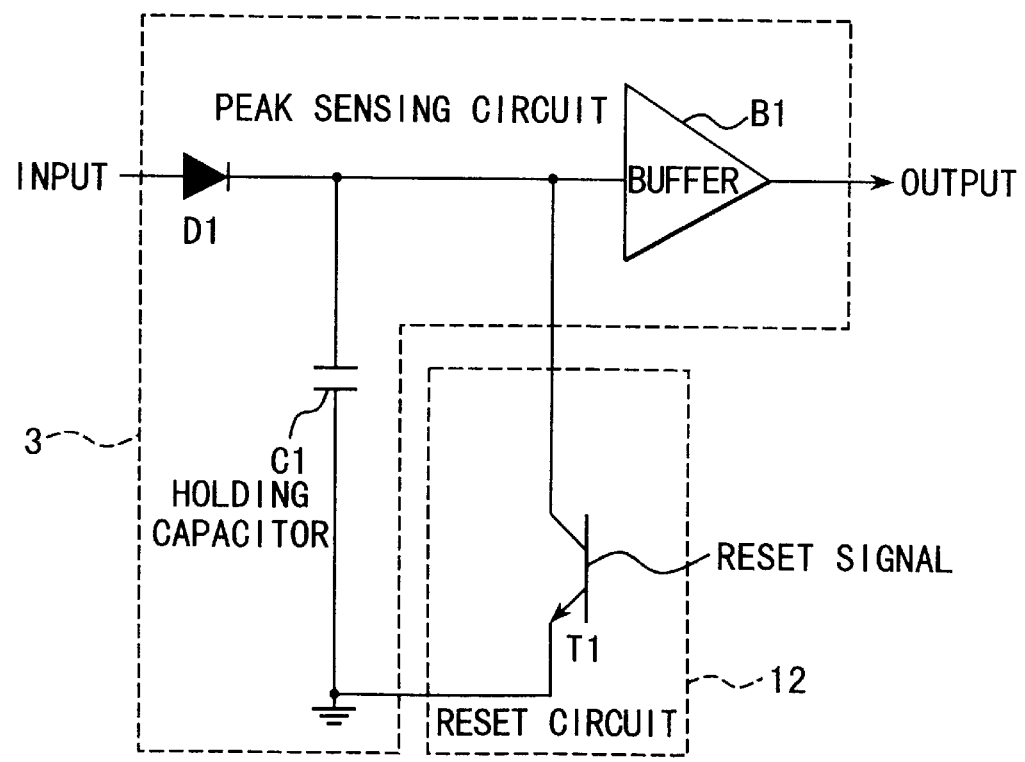
F I G. 13

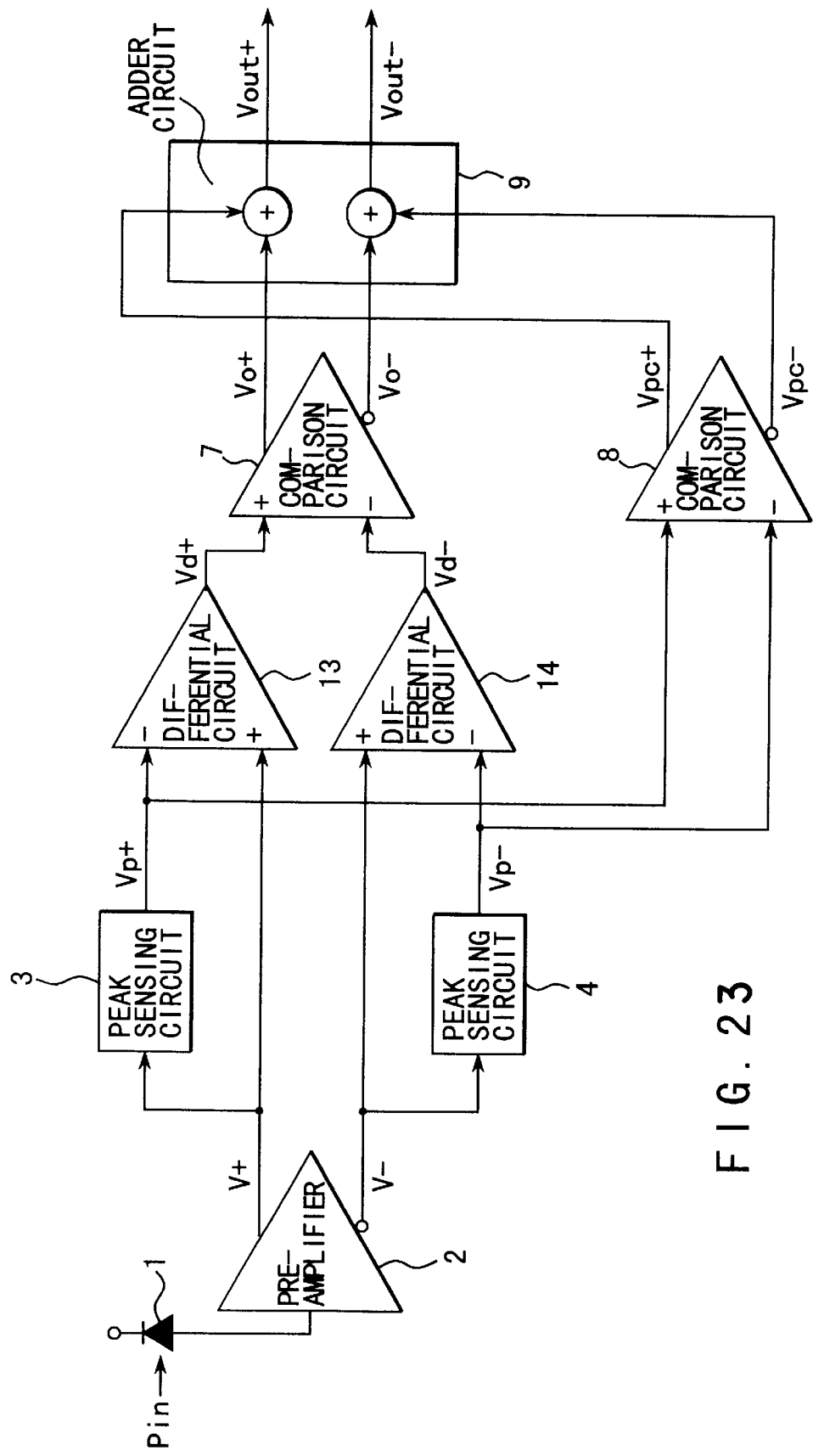
F I G. 23

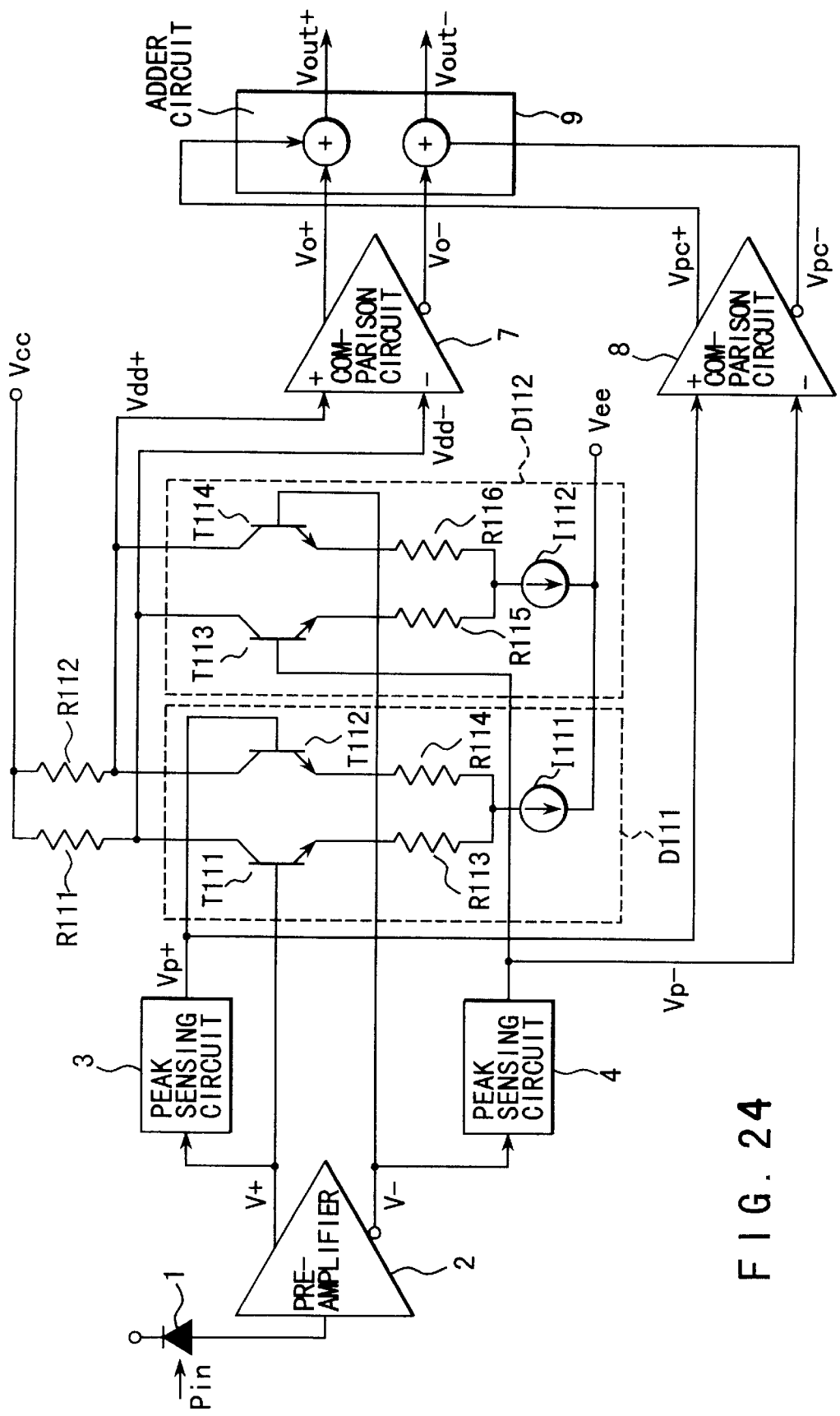
F I G. 24

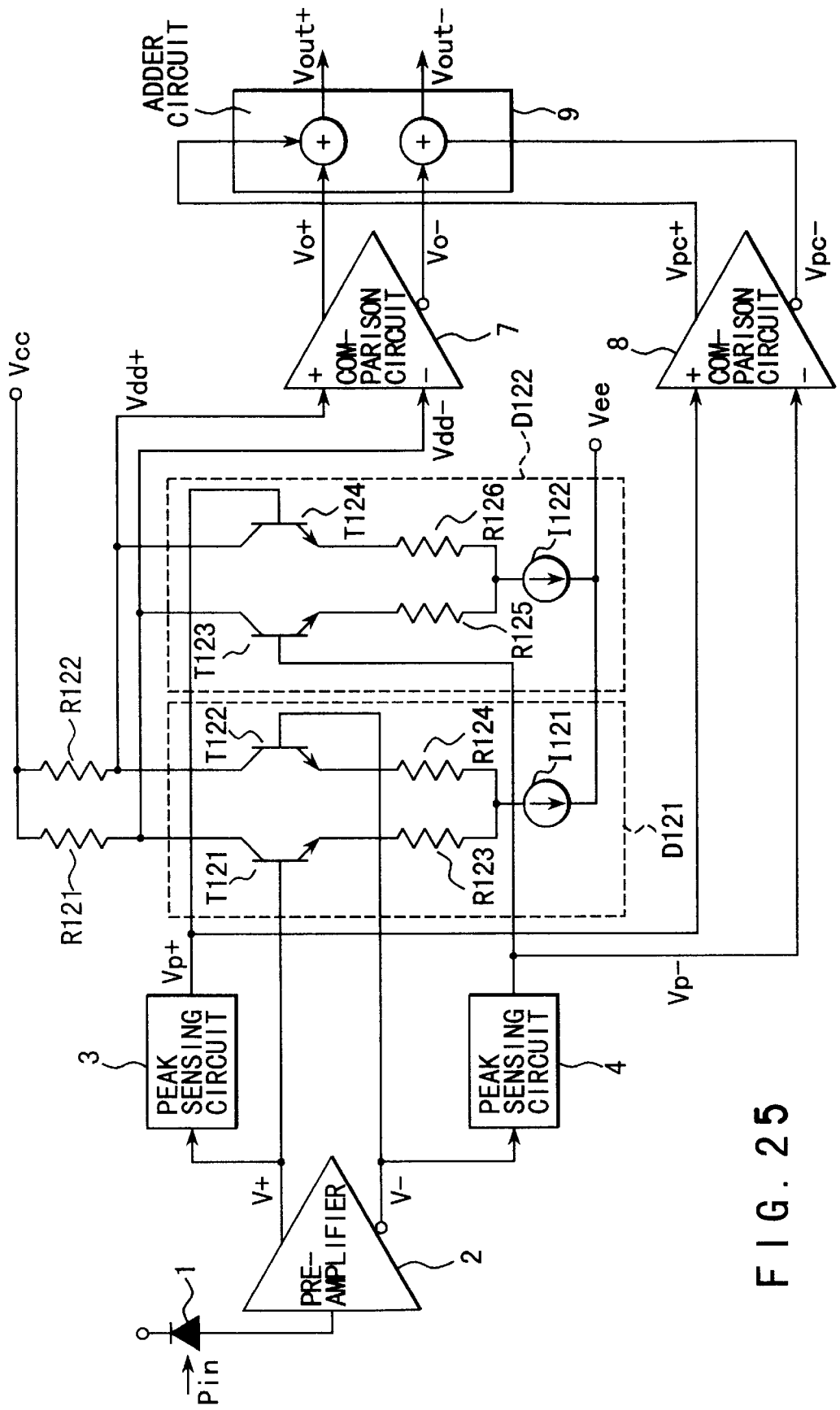
F I G. 2 5

DIGITAL SIGNAL RECEIVER CIRCUIT

BACKGROUND OF THE INVENTION

This invention relates to a burst compatible digital signal receiver circuit used in the field of optical communications, including optical subscriber systems, optical LANs, and optical interconnections.

Two-mode differential transfer impedance amplifiers have been used as the automatic threshold control (ATC) circuit in a conventional burst signal compatible digital signal receiver circuit. The configuration and operation of the two-mode differential transfer impedance amplifier has been disclosed concretely in U.S. Pat. No. 5,025,456.

FIG. 1 is a block diagram of the two-mode differential transfer impedance amplifier. The amplifier comprises a photodiode (light-receiving element) PD, a differential input/output amplifier OP, a peak sensing circuit PDC, and feedback resistors Rf1 and Ff2.

The optical signal Pin projected on the photodiode PD is converted into photoelectric current, which is supplied to the (+) input terminal of the differential input/output amplifier OP. The differential input/output amplifier OP amplifies the level difference between the photoelectric current Iin from the photodiode PD and the threshold value supplied to the (−) input terminal. The inverting output of the amplifier is fed back to the (+) input terminal of the amplifier OP via the feedback resistor Rf1. The noninverting output is supplied to the peak sensing circuit PDC.

The peak sensing circuit PDC senses the peak of the noninverting output of the amplifier OP. The sense output is supplied as the threshold value to the (−) input terminal of the amplifier OP via the feedback resistor Rf2.

Namely, the two-mode differential transfer impedance amplifier outputs such a waveform as always has the output voltage in the middle of the pulse width when there is no signal input, by making the transfer impedance of each of the second and later bits in the burst signal twice as large as that of the first bit in the burst signal.

The aforementioned burst signal compatible digital signal receiver circuit, however, has the following problem: because the operating point of the preamplifier fluctuates as a result of fluctuations in the dark current of the light-receiving element or fluctuations in the output offset voltage of the preamplifier, the duty and reception sensitivity of the identification circuit with a fixed threshold value deteriorate.

There has been another problem: when the marking rate of the input signal has fluctuated, or when the same symbols have continued, the output of the peak sensing circuit PDC fluctuates, resulting in the deterioration of the duty and reception sensitivity.

BRIEF SUMMARY OF THE INVENTION

The object of the present invention is to provide a burst signal compatible digital signal receiver circuit capable of alleviating duty deterioration and the deterioration of the reception sensitivity resulting from the dark current of a light-receiving element or fluctuations in the output offset voltage of a preamplifier, fluctuations in the marking rate of the input signal, or the continuation of the same symbols.

The foregoing object is accomplished by providing a digital signal receiver circuit comprising: a preamplifier for generating a positive phase signal and the opposite phase signal from an input digital signal; a first level sensing circuit for sensing and holding either the peak value or the bottom value of the positive phase output of the preamplifier; a second level sensing circuit for sensing and holding the same level value as that of the first level sensing circuit from the peak value or bottom value of the opposite phase output of the preamplifier; a first median output circuit for outputting the median between the positive phase output of the preamplifier and the output of the second level sensing circuit; a second median output circuit for outputting the median between the opposite phase output of the preamplifier and the output of the first level sensing circuit; and a first level comparison circuit for comparing the output of the first median output circuit with the output of the second median output circuit and outputting a signal voltage with a constant amplitude within a specific input voltage range, wherein the first and second level sensing circuits, first and second median output circuits, and the first level comparison circuit constitute an offset compensating section that performs the offset compensation of the DC level difference of the output of the preamplifier, and the first level comparison circuit constitutes an amplitude limit amplifier section that compares and amplifies the output of the offset compensating section.

The foregoing object is accomplished by providing a digital signal receiver circuit comprising: a preamplifier for generating a positive phase signal and the opposite phase signal from an input digital signal; a first level sensing circuit for sensing and holding either the peak value or the bottom value of the positive phase output of the preamplifier; a second level sensing circuit for sensing and holding the same level value as that of the first level sensing circuit from the peak value or bottom value of the opposite phase output of the preamplifier; a first differential circuit that determines the difference between the positive phase output of the preamplifier and the output of the first level sensing circuit and outputs the difference; a second differential circuit that has the same gain as that of the first differential circuit and that determines the difference between the opposite phase output of the preamplifier and the output of the second level sensing circuit and outputs the difference; a first level comparison circuit that compares the output of the first differential circuit with the output of the second differential circuit and outputs a signal voltage with a constant amplitude within a specific input voltage amplitude range; a second level comparison circuit that has the gain equal to the product of the gain of the first or second differential circuit and the gain of the first level comparison circuit and that compares the output of the first level sensing circuit with the output of the second level sensing circuit and outputs a signal voltage with a constant amplitude within a specific input voltage amplitude range; and an adder circuit that adds the output of the first level comparison circuit to the output of the second level comparison circuit, wherein the first and second level sensing circuits, first and second differential circuits, and first level comparison circuit constitute an offset compensating section that performs the offset compensation of the DC level difference of the output of the preamplifier, the first level comparison circuit constitutes an amplitude limit amplifier section that compares and amplifies the output of the offset compensating section, and the second level comparison circuit and the adder circuit constitute a DC level reproducing section that compensates for fluctuations in the outputs of the first and second level sensing circuits.

The foregoing object is accomplished by providing a digital signal receiver circuit comprising: a preamplifier for generating a positive phase signal and the opposite phase signal from an input digital signal; a first level sensing circuit for sensing and holding either the peak value or the bottom value of the positive phase output of the preamplifier; a second level sensing circuit for sensing and holding the same level value as that of the first level sensing circuit from the peak value or bottom value of the opposite phase output of the preamplifier; a first differential circuit that determines the difference between the positive phase output and opposite phase output of the preamplifier and outputs the difference; a second differential circuit that has the same gain as that of the first differential circuit and that determines the difference between the outputs of the first and second level sensing circuits and outputs the difference; a first level comparison circuit that compares the output of the first differential circuit with the output of the second differential circuit and outputs a signal voltage with a constant amplitude within a specific input voltage amplitude range; a second level comparison circuit that has the gain equal to the product of the gain of the first or second differential circuit and the gain of the first level comparison circuit and that compares the output of the first level sensing circuit with the output of the second level sensing circuit and outputs a signal voltage with a constant amplitude within a specific input voltage amplitude range; and an adder circuit that adds the output of the first level comparison circuit to the output of the second level comparison circuit, wherein the first and second level sensing circuits, first and second differential circuits, and first level comparison circuit constitute an offset compensating section that performs the offset compensation of the DC level difference of the output of the preamplifier, the first level comparison circuit constitutes an amplitude limit amplifier section that compares and amplifies the output of the offset compensating section, and the second level comparison circuit and the adder circuit constitute a DC level reproducing section that compensates for fluctuations in the outputs of the first and second level sensing circuits.

The foregoing object is accomplished by providing a digital signal receiver circuit comprising: a preamplifier for generating a positive phase signal and the opposite phase signal from an input digital signal; a first level sensing circuit for sensing and holding either the peak value or the bottom value of the positive phase output of the preamplifier; a second level sensing circuit for sensing and holding the same level value as that of the first level sensing circuit from the peak value or bottom value of the opposite phase output of the preamplifier; a first differential circuit that determines the difference between the positive phase output and opposite phase output of the preamplifier and outputs at least the positive phase signal; a second differential circuit that has the same gain as that of the first differential circuit and that determines the difference between the output of the first level sensing circuits and the output of the second level sensing circuit and outputs the positive phase signal and opposite phase signal; a first level comparison circuit that compares the positive phase output of the first differential circuit with the positive phase output of the second differential circuit and outputs a signal voltage with a constant amplitude within a specific input voltage amplitude range; a second level comparison circuit that has the same gain as that of the first level comparison circuit and that compares the positive phase output and opposite phase output of the second differential circuit and outputs a signal voltage with a constant amplitude within a specific input voltage amplitude range; and an adder circuit that adds the output of the first level comparison circuit to the output of the second level comparison circuit, wherein the first and second level sensing circuits and first and second differential circuits constitute an identification level sensing section that senses the identification level of the output of the first differential circuit, the first level comparison circuit constitutes an amplitude limit amplifier section that compares and amplifies the output of the identification level sensing section, and the second level comparison circuit and the adder circuit constitutes a DC level reproducing section that compensates for fluctuations in the outputs of the first and second level sensing circuits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram of a digital optical receiver circuit according to a first embodiment of the present invention;

FIG. 4 is a block diagram of a digital optical receiver circuit according to a second embodiment of the present invention;

FIG. 5 is a block diagram of a digital optical receiver circuit according to a third embodiment of the present invention;

FIG. 6 is a block diagram of a digital optical receiver circuit according to a fourth embodiment of the present invention;

FIGS. 7A to 7D is a timing waveform diagram to help explain the operation principle of the fourth embodiment;

FIG. 9 is a block diagram of a digital optical receiver circuit according to a sixth embodiment of the present invention;

FIG. 11 is a block diagram of a digital optical receiver circuit according to a eighth embodiment of the present invention;

FIG. 12 is a block diagram of a digital optical receiver circuit according to a ninth embodiment of the present invention;

FIG. 13 is a circuit diagram of the first peak sensing circuit and the reset circuit in the ninth embodiment;

FIG. 23 is a block diagram of a digital optical receiver circuit according to a eighteenth embodiment of the present invention;

FIG. 24 is a block diagram of a digital optical receiver circuit according to a nineteenth embodiment of the present invention;

FIG. 25 is a block diagram of a digital optical receiver circuit according to a twentieth embodiment of the present invention;

DETAILED DESCRIPTION OF THE INVENTION

Figure 1:
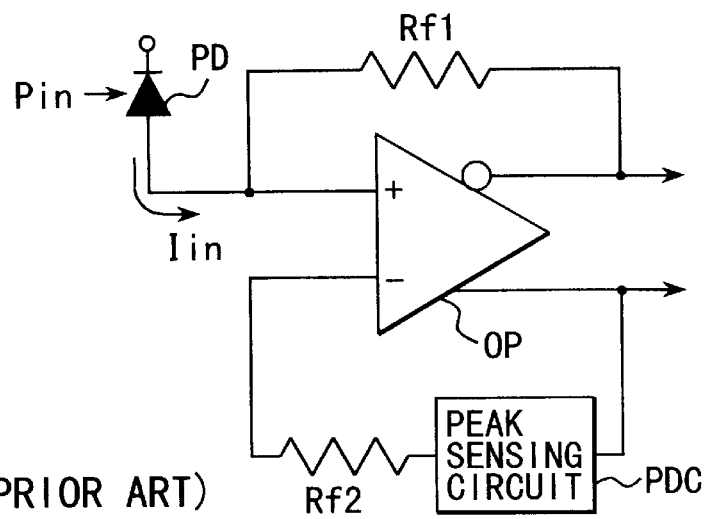
FIG. 1 is a block diagram of a conventional digital optical receiver circuit (two-mode differential transfer impedance amplifier)

Hereinafter, referring to the accompanying drawings, embodiments of the present invention will be explained.

FIG. 2 shows the configuration of a digital optical receiver circuit according to a first embodiment of the present invention. The optical receiver circuit comprises a photodiode 1, a preamplifier 2, a first and second peak sensing circuits 3 and 4, a first and second median output circuits 5 and 6, and a level comparison circuit 7.

The input optical signal pin projected on the photodiode 1 is converted into a photoelectric current, which is current-voltage converted by the preamplifier 2. The preamplifier then produces the positive phase output $V_+$ and the opposite phase output $V_-$. The first and second peak sensing circuits 3 and 4 sense and hold the positive phase output $V_+$ and opposite phase output $V_-$ of the preamplifier 2.

The first median output circuit 5 outputs the median $V_{m+}$ between the positive phase output $V_+$ of the preamplifier 2 and the output $V_{p-}$ of the second peak sensing output circuit 4. Similarly, the second median output circuit 6 outputs the median $V_{m-}$ between the opposite phase output $V_-$ of the preamplifier 2 and the output $V_{p+}$ of the first peak sensing output circuit 3.

The level comparison circuit 7 compares the level of the output $V_{m+}$ of the first median output circuit 5 and that of the output $V_{m-}$ of the second median output circuit 6 and amplifies the level difference, thereby producing a reception signal Vo.

The operation of the first embodiment thus constructed will be described by reference to FIGS. 3A to 3D.

With the configuration of FIG. 2, the structure including the peak sensing circuits 3, 4 and median output circuits 5, 6 functions as an offset compensating section. The first level comparison circuit 7 functions as an amplitude limit amplifier section.

Figure 3A:
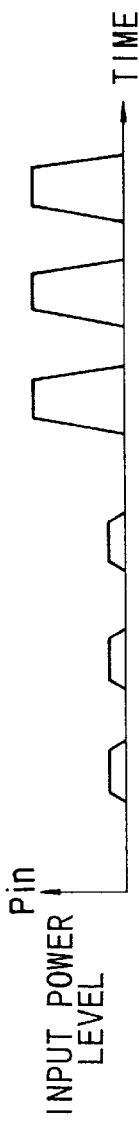
FIGS. 3A to 3D is a timing waveform diagram to help explain the operation principle of the first embodiment.
Figure 3B:
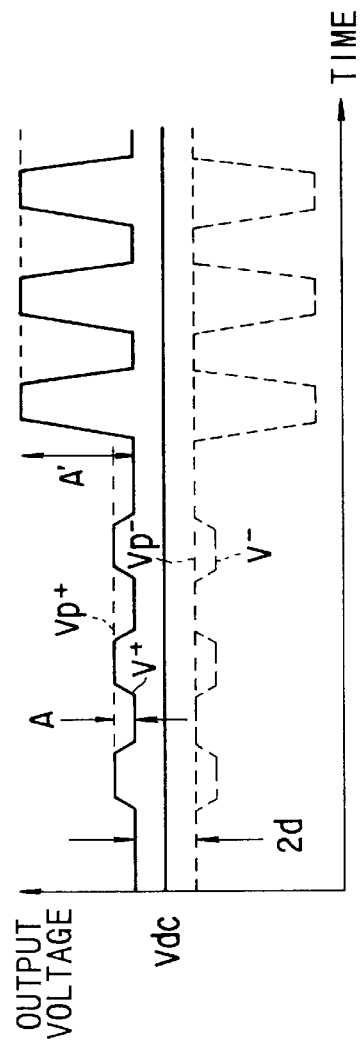
Figure 3C:
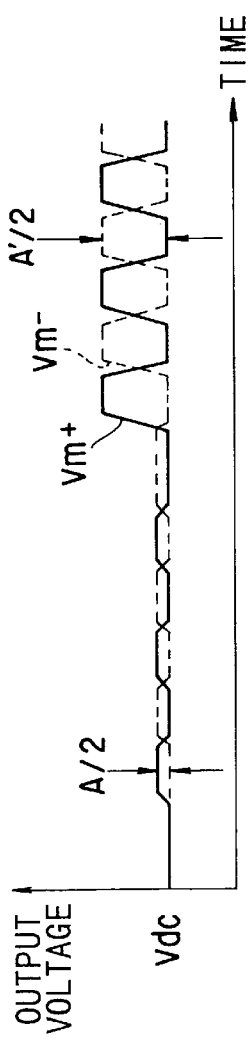
Figure 3D:
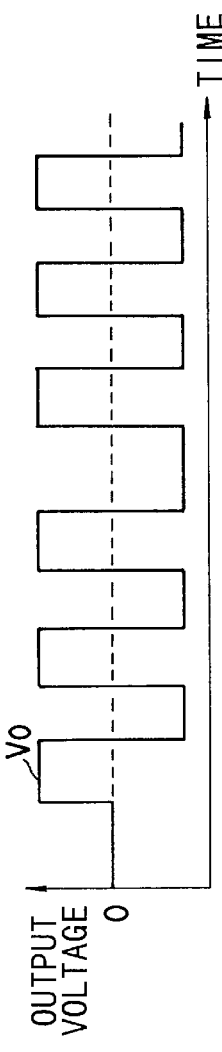

FIGS. 3A to 3D is a timing waveform diagram to help explain the operation principle of the first embodiment. FIG. 3A shows the power level change of the input optical signal Pin; FIG. 3B shows the level change of the positive phase output $V_+$ and opposite phase output $V_-$ of the preamplifier 2 and the level change of the peak sensing outputs $V_{p+}$ and $V_{p-}$ of the peak sensing circuits 3, 4; FIG. 3C shows the level change of the median output $V_{m+}$ and $V_{m-}$ of the median output circuits 5, 6; and FIG. 3D shows the level change of the output Vo of the level comparison circuit 7.

In general, the burst signal compatible receiver circuit enables response, starting with the first bit, so that AC connection is not suitable for this circuit and therefore DC connection is used. For this reason, as shown in FIG. 3B, the positive phase output $V_+$ and opposite phase output $V_-$ of the preamplifier 2 have the DC offset voltage $2d$ resulting from the dark current of the photodiode 1 or the offset noise voltage in the preamplifier 2 when there is no signal input.

First, when a burst signal is being waited for, that is, when no signal with input optical signal Pin=0 has been continuing, the positive phase output $V_+$ and opposite output $V_-$ of the preamplifier 2 are given by the following equations:

$$V_+ = Vdc + d \qquad (1)$$

$$V_- = Vdc - d \qquad (2)$$

where Vdc is expressed as:

$$Vdc = (V_+ + V_-)/2 \qquad (3)$$

Vdc is therefore constant, regardless of the input optical Pin and DC offset voltage d.

The output $V_{p+}$ of the first peak sensing circuit 3 and the output $V_{p-}$ of the second peak sensing circuit 4 are given by the following equations, which are the same as equation (1) and equation (2):

$$V_{p+} = Vdc - d \qquad (4)$$

$$V_{p-} = Vdc + d \qquad (5)$$

As a result, the output $V_{m+}$ of the first median output circuit 5 and the output $V_{m-}$ of the second median output circuit 6 are given by the following equations:

$$V_{m+} = (V_+ + V_{p-})/2 = Vdc \qquad (6)$$

$$V_{m-} = (V_- + V_{p+})/2 = Vdc \qquad (7)$$

Then, when the input optical signal Pin is supplied, the input optical signal Pin is converted photoelectrically by the photodiode 1, followed by the current-voltage conversion at the preamplifier 2. When the first bit in the burst signal has peaked, this gives:

$$V_+ = Vdc - d + A \qquad (8)$$

$$V_- = Vdc + d - A \qquad (9)$$

where A is the amplitude of the positive phase output $V_+$ and the opposite phase output $V_-$.

To cause the first peak sensing circuit 3 to sense and hold the peak of the positive phase output $V_+$, the peak sense output $V_{p+}$ is given by:

$$V_{p+}=V_+=Vdc-d+A \tag{10}$$

To cause the second peak sensing circuit 4 to sense and hold the peak of the opposite phase output $V_-$, the peak sense output $V_{p-}$ is given by equation (5) for no signal. As a result, the output $V_{m+}$ of the first median output circuit 5 and the output $V_{m-}$ of the second median output circuit 6 are as shown in FIG. 3C and are given by the following equations:

$$V_{m+}=Vdc+A/2 \tag{11}$$

$$V_{m-}=Vdc \tag{12}$$

Then, when the input optical signal Pin goes low again, the positive phase output $V_+$ and opposite phase output $V_-$ of the preamplifier 2 are expressed again by equation (1) and equation (2). At this time, the output $V_{p+}$ of the first peak sensing circuit 3 has the value of equation (10) at the time when it was at the high level, and the output $V_{p-}$ of the second peak sensing circuit has the value of equation (5) at the time when there was no signal. As a result, the output $V_{m+}$ of the first median output circuit 5 and the output $V_{m-}$ of the second median output circuit 6 are given by the following equations:

$$V_{m+}=Vdc \tag{13}$$

$$V_{m-}=Vdc+A/2 \tag{14}$$

Therefore, the output $V_{m+}$ of the first median output circuit 5 and the output $V_{m-}$ of the second median output circuit 6 are complementary signals whose amplitude is A/2 and which have the same DC level.

As a result, the comparison of $V_{m+}$ with $V_{m-}$ at the level comparison circuit 7 makes it possible to output the reception signal Vo, starting with the first bit in the burst signal, without permitting duty fluctuations and the deterioration of the reception sensitivity resulting from the output offset voltage of the preamplifier 2. The same holds true when the amplitude of the positive phase output $V_+$ and that of the opposite phase output $V_-$ increase to A'.

FIG. 4 shows the configuration of a digital optical receiver circuit according to a second embodiment of the present invention. In the optical receiver circuit, the first and second median output circuits 5, 6 are composed of resistance division circuits consisting of resistors R1, R2, R3, and R4. It is assumed that the resistance values of the resistors R1 to R4 are R1=R2 and R3=R4. With this configuration, the median output circuits 5, 6 can be realized easily.

FIG. 5 shows the configuration of a digital optical receiver circuit according to a third embodiment of the present invention. In this optical receiver circuit, the first and second peak sensing circuits 3, 4 in the first embodiment are replaced with a first and second bottom value sensing circuits 3', 4', respectively. The third embodiment, in which the peak values are replaced with the bottom values, operates in a similar manner to the first embodiment, and produces a similar effect.

FIG. 6 shows the configuration of a digital optical receiver circuit according to a fourth embodiment of the present invention. In the optical receiver circuit, the first and second median output circuits 5, 6 in the first embodiment are replaced with a first and second adder circuits 5', 6'.

FIGS. 7A to 7D is a timing waveform diagram to help explain the operation principle of the fourth embodiment. FIG. 7A shows the power level change of the input optical signal Pin; FIG. 7B shows the level change of the positive phase output $V_+$ and opposite phase output $V_-$ of the preamplifier 2 and the level change of the peak sensing outputs $V_{p+}$ and $V_{p-}$ of the respective peak sensing circuits 3, 4; FIG. 7C shows the level change of the addition outputs $V_{a+}$ and $V_{a-}$ of the adder circuits 5', 6'; and FIG. 7D shows the level change of the output Vo of the level comparison circuit 7.

As seen from these figures, with the configuration of the fourth embodiment, the output $V_{a+}$ of the first adder circuit 5' and the output $V_{a-}$ of the adder circuit 6' are signals having the same amplitude and DC level. Therefore, the fourth embodiment operates in a similar manner to the first embodiment and produces a similar effect.

Figure 8:
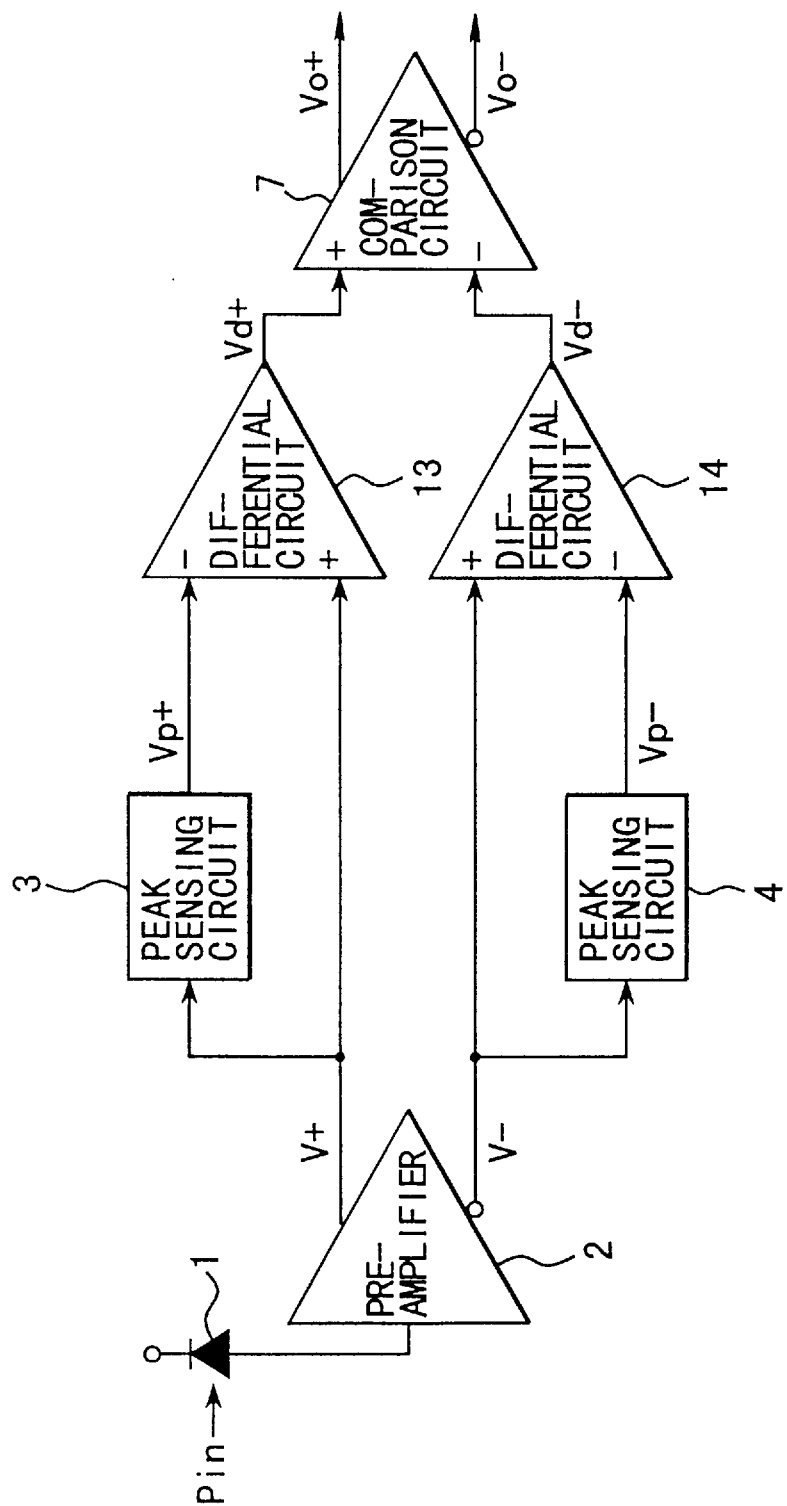
FIG. 8 is a block diagram of a digital optical receiver circuit according to a fifth embodiment of the present invention.

FIG. 8 shows the configuration of a digital optical receiver circuit according to a fifth embodiment of the present invention. In the optical receiver circuit, the offset compensating section in the tenth embodiment of FIG. 2 is composed of peak sensing circuits 3 and 4, a first differential circuit 13 that outputs the difference between the positive phase output $V_+$ of the preamplifier 2 and the output $V_{p+}$ of the peak sensing circuit 3, a second differential circuit 14 that outputs the difference between the opposite phase output $V_-$ of the preamplifier 2 and the output $V_{p-}$ of the peak sensing circuit 4.

With the configuration of the embodiment, the output $V_{d+}$ of the first differential circuit 13 and the output $V_{d-}$ of the second differential circuit 14 are complementary signals that are the same in amplitude and DC level. As a result, the fifth embodiment operates in a similar manner to the embodiment of FIG. 2 and produces a similar effect.

FIG. 9 shows the configuration of a digital optical receiver circuit according to a sixth embodiment of the present invention. In the optical receiver circuit, the offset compensating section in the first embodiment of FIG. 2 is composed of peak sensing circuits 3 and 4, a first differential circuit D111 that uses the positive phase output $V_+$ of the preamplifier 2 and the output $V_{p+}$ of the peak sensing circuit 3 as inputs, a second differential circuit D112 that uses the opposite phase output $V_-$ of the preamplifier 2 and the output $V_{p-}$ of the peak sensing circuit 4 as inputs, and a current addition-type differential circuit pair made up of a first collector resistor R111 and a second collector resistor R112.

The first differential circuit D111 is composed of a first transistor T111 whose base is supplied with the positive phase output $V_+$ of the preamplifier 2, a second transistor T112 whose base is supplied with the output $V_{p+}$ of the peak sensing circuit 3, a resistor R113 one end of which is connected to the emitter of the first transistor T111, a resistor R114 one end of which is connected to the emitter of the second transistor T112, and a first current source I111 connected to the other end of each of the resistors R113, R114.

The second differential circuit D112 is composed of a third transistor T113 whose base is supplied with the output $V_{p-}$ of the peak sensing circuit 4, a fourth transistor T114 whose base is supplied with the opposite phase output $V_-$ of the preamplifier 2, a resistor R115 one end of which is connected to the emitter of the third transistor T113, a resistor R116 one end of which is connected to the emitter of the fourth transistor T114, and a second current source I112 connected to the other end of each of the resistors R115, R116.

The collector of the first transistor T111 and that of the third transistor T113 are connected to a first common collector resistor R111. The collector of the second transistor T112 and that of the fourth transistor T114 are connected to a second common collector resistor R112.

It is assumed that the resistors R111, R112, R113, R114, R115, and R116 have the following resistance values: R111= R112, R113=R114=R115=R116.

With the configuration of the embodiment, the positive phase output $V_{dd+}$ and opposite output $V_{dd-}$ of the current addition-type differential circuit pair are complementary signals that are the same in amplitude and DC level. As a result, the sixth embodiment operates in a similar manner to the embodiment of FIG. 2 and produces a similar effect.

Figure 10:
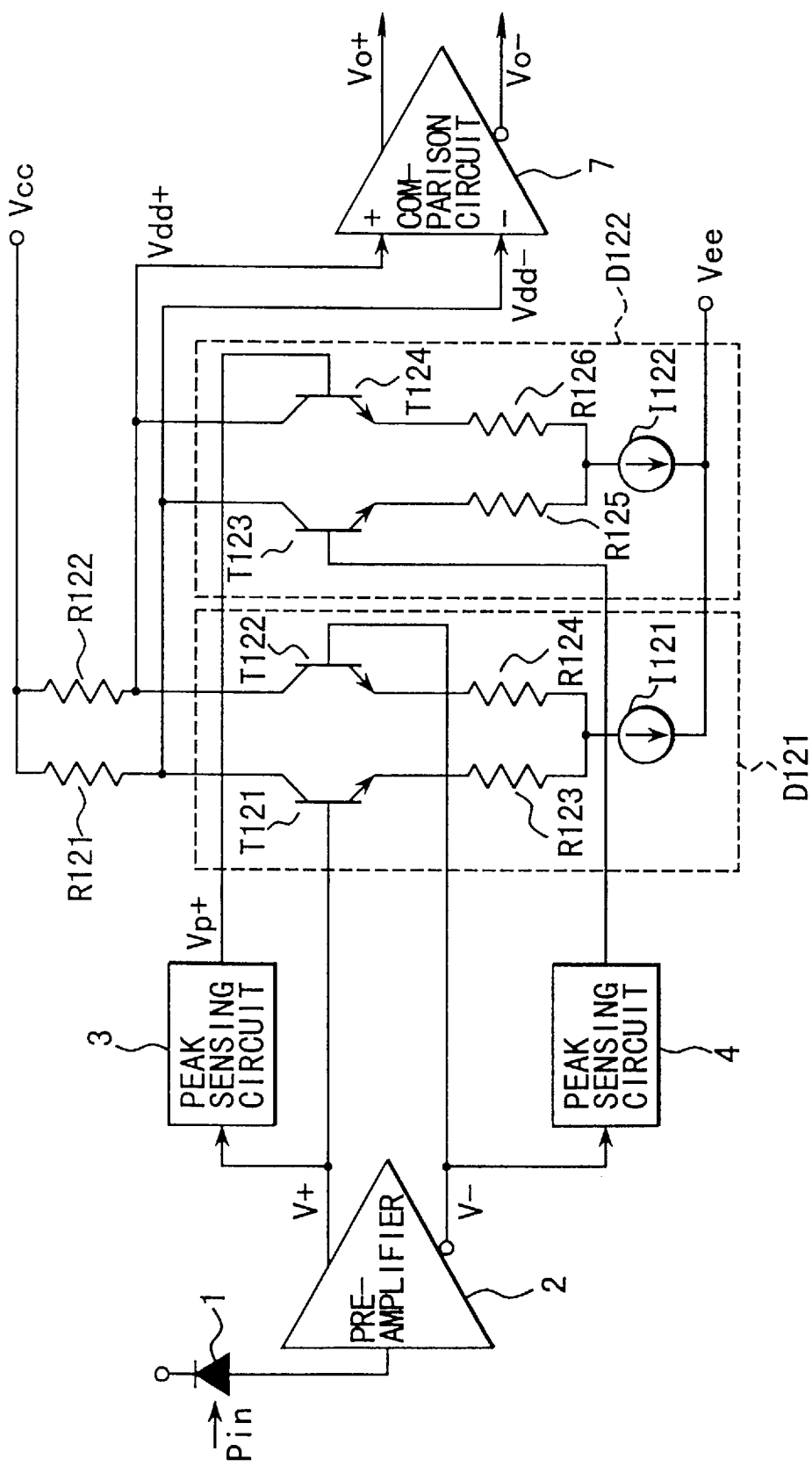
FIG. 10 is a block diagram of a digital optical receiver circuit according to a seventh embodiment of the present invention.

FIG. 10 shows the configuration of a digital optical receiver circuit according to a seventh embodiment of the present invention. In the optical receiver circuit, the offset compensating section in the tenth embodiment is composed of peak sensing circuits 3 and 4, a first differential circuit D121 that uses the positive phase output $V_+$ and opposite phase output $V_-$ of the preamplifier 2 as inputs, a second differential circuit D122 that uses the output $V_{p-}$ of the peak sensing circuit 4 and the output $V_{p+}$ of the peak sensing circuit 3 as inputs, and a current addition-type differential circuit pair made up of a first collector resistor R121 and a second collector resistor R122.

The first differential circuit D121 is composed of a first transistor T121 whose base is supplied with the positive phase output $V_+$ of the preamplifier 2, a second transistor T122 whose base is supplied with the opposite phase output $V_-$ of the preamplifier 2, a resistor R123 one end of which is connected to the emitter of the first transistor T121, a resistor R124 one end of which is connected to the emitter of the second transistor T122, and a first current source I121 connected to the other end of each of the resistors R123, R124.

The second differential circuit D122 is composed of a third transistor T123 whose base is supplied with the output $V_{p-}$ of the peak sensing circuit 4, a fourth transistor T124 whose base is supplied with the output $V_{p+}$ of the peak sensing circuit 3, a resistor R125 one end of which is connected to the emitter of the third transistor T123, a resistor R126 one end of which is connected to the emitter of the fourth transistor T124, and a second current source I122 connected to the other end of each of the resistors R125, R126.

The collector of the first transistor T121 and that of the third transistor T123 are connected to a first common collector resistor R121. The collector of the second transistor T122 and that of the fourth transistor T124 are connected to a second common collector resistor R122.

It is assumed that the resistors R121, R122, R123, R124, R125, and R126 have the following resistance values: R121=R122, R123=R124=R125=R126.

With the configuration of the embodiment, the positive phase output $V_{dd+}$ and opposite output $V_{dd-}$ of the current addition-type differential circuit pair are complementary signals that are the same in amplitude and DC level. As a result, the seventh embodiment operates in a similar manner to the embodiment of FIG. 2 and produces a similar effect.

FIG. 11 shows the configuration of a digital optical receiver circuit according to a eighth embodiment of the present invention. In the optical receiver circuit, the structure after the preamplifier 2, including the peak sensing circuits 3, 4, median output circuits 4, 6, and level comparison circuit 7, is determined to be an offset compensating section A, and n stages of offset compensating section A are connected in a cascade. The offset compensating sections at the individual stages are indicated by reference symbols A1, A2, ..., An, respectively.

In the case of the configuration of one stage offset compensating section A, the level comparison circuit 7 has to cover the amplification of small signals to large signals. Therefore, the level comparison circuit must have a relatively large gain.

Because the level comparison circuit 7 with a large gain amplifies the input offset voltage arising from variations in the elements, it cannot identify a small signal. A similar problem arises when variations in the accuracy of the peak sensing circuits 3, 4 prevent an accurate offset compensation.

To overcome this problem, the configuration of the embodiment widens the input voltage range for linear operation by connecting multiple stages of offset compensation section A and thereby decreasing the gain of the level comparison circuit 7 at each stage. With this configuration, a small signal can be amplified in the linear operation range of the level comparison circuit 7 at each stage. Even when an accurate offset compensation cannot be made because of the offset voltage caused for the aforementioned reason, offset compensation can be made again at the following and later offset compensation sections.

As described above, when the offset caused at the offset compensating section at each stage is sufficiently smaller than the signal limited at the level comparison circuit 7, the signal can be amplified, while being compensated at each stage. This makes it possible to carry out offset compensation efficiently and widen the dynamic range.

While in the eighth embodiment, replacing the peak sensing circuits 3, 4 of each of the offset compensating sections A1 to An with bottom value sensing circuits enables a similar operation.

The offset compensation sections A1 to An may be replaced by those of the type shown in FIG. 9 or FIG. 10 or by those of the type shown in FIG. 8, FIG. 12 (later described). In this case, the same advantages as the embodiment shown in FIG. 11 are achieved.

With the configuration of each of the above embodiments, when a small amplitude burst signal is inputted immediately after a large amplitude burst signal, the charge held in the peak sensing circuits 3, 4 or the bottom value sensing circuits 3', 4' cannot be discharged instantaneously, and there is a possibility that the receiver circuit will malfunction.

FIG. 12 shows the configuration of a digital optical receiver circuit according to a ninth embodiment of the present invention. In the optical receiver circuit, a reset circuit 12 that resets the first and second peak sensing circuits 3, 4 is added to the configuration of the first embodiment. Receiving a reset signal, the reset circuit 12 returns the first and second peak sensing circuits 3, 4 to the initial state instantaneously.

With the above configuration, even when a small amplitude burst signal is inputted immediately after a large amplitude burst signal, it is possible to recognize the burst signal, starting the first bit, by supplying a reset signal to the reset circuit 12 after the burst signal has ended.

FIG. 13 shows a concrete configuration of the first peak sensing circuit 3 and reset circuit 12. The peak sensing circuit 3 applies the input voltage to a holding capacitor C1 via a diode D1, thereby charging the holding capacitor C1, and supplies the charging voltage from a buffer B1. Specifically, when the input signal is at the high level, the peak sensing circuit charges the holding capacitor C1. When the input signal is at the low level, the circuit makes the input and output a high impedance, thereby cutting off the discharging path of the charge held in the holding capacitor C1 to sense and hold the peak value.

The reset circuit 12 is composed of a transistor T1 in parallel with the holding capacitor C1 of the peak sensing circuit 3. By inputting a reset signal to the base of the transistor T1, it is possible to discharge the charge held in the holding capacitor C1 instantaneously and thereby reset the peak sensing circuit 3.

By connecting the transistor T1 in parallel with the holding capacity of the second peak sensing circuit 4, it is possible to reset the second peak sensing circuit 4 together with the first peak sensing circuit 3.

With the configuration shown in each of FIGS. 4, 5, 6, 8, 9, 10 and 11, a similar operation to that of the embodiment of FIG. 12 can be realized by providing a reset circuit that resets the peak sensing circuits 3, 4 or the bottom value sensing circuits 3', 4'.

With the configuration composed only of the offset compensating sections and the amplitude limit amplifier sections, when the marking rate of the input signal has fluctuated, or when the same symbols have continued, the charge held in the peak sensing circuit 3 or 4 will be discharged. In the case of small signals, in particular, the offset compensating section cannot carry out accurate offset compensation because the output $V_{p+}$ of the peak sensing circuit 3 or the output $V_{p-}$ of the peak sensing circuit 4 fluctuates.

To require the response from the first bit in the burst signal, the time constant of each of the peak sensing circuits 3, 4 has to be set small, causing resistance to fluctuations in the marking rate and resistance to the continuation of the same symbols to deteriorate more.

In the case, even if a multistage structure as shown in FIG. 11 is used, variations in the outputs $V_{p+}$ and $V_{p-}$ of the peak sensing circuits 3, 4 caused at the preceding stage cannot be removed. The function of the aforementioned DC level reproducing section is effective in removing such fluctuations in the embodiments which will be described below.

Figure 14:
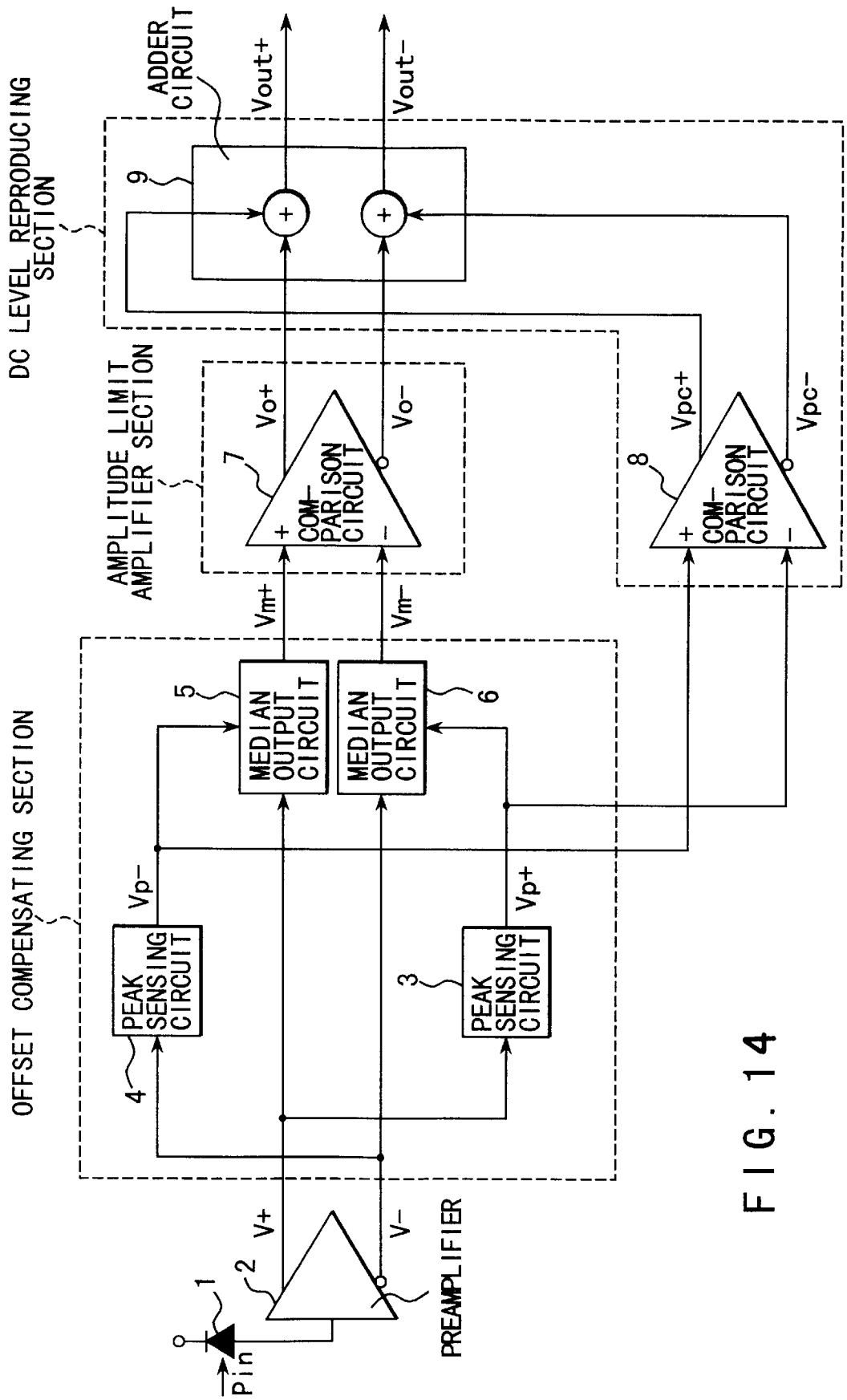
FIG. 14 is a block diagram of a digital optical receiver circuit according to a tenth embodiment of the present invention.

FIG. 14 shows the configuration of a digital optical receiver circuit according to a tenth embodiment of the present invention. The optical receiver circuit comprises a photodiode 1, a preamplifier 2, a first and second peak sensing circuits 3, 4, a first and second median output circuits 5, 6, and a first level comparison circuit 7, as the first embodiment. The optical receiver circuit of the tenth embodiment further comprises a second level comparison circuit 8 and an adder circuit 9.

The input optical signal pin projected on the photodiode 1 is converted into a photoelectric current, which is current-voltage converted by the preamplifier 2. The preamplifier then produces the positive phase output $V_+$ and the opposite phase output $V_-$. The first and second peak sensing circuits 3 and 4 sense and hold the peaks of the positive phase output $V_+$ and opposite phase output $V_-$ of the preamplifier 2, respectively.

The first median output circuit 5 outputs the median $V_{m+}$ between the positive phase output $V_+$ of the preamplifier 2 and the output $V_{p-}$ of the second peak sensing output circuit 4. Similarly, the second median output circuit 6 outputs the median $V_{m-}$ between the opposite phase output $V_-$ of the preamplifier 2 and the output $V_{p+}$ of the first peak sensing output circuit 3.

The first level comparison circuit 7 compares the level of the output $V_{m+}$ of the first median output circuit 5 and that of the output $V_{m-}$ of the second median output circuit 6 and amplifies the level difference, thereby producing the positive phase output $V_{o+}$ and opposite phase output $V_{o-}$. The second level comparison circuit 8 compares the level of the output $V_{p+}$ of the peak sensing circuit 3 and that of the output $V_{p-}$ of the peak sensing circuit 4 and amplifies the level difference with the gain half of the first level comparison circuit 7, thereby producing the positive phase output $V_{pc+}$ and opposite phase output $V_{pc-}$.

The adder circuit 9 adds the output $V_{o+}$ of the first level comparison circuit 7 to the output $V_{pc+}$ of the second level comparison circuit 8 and the output $V_{o-}$ of the first comparison circuit 7 to the output $V_{pc-}$ of the second level comparison circuit 8, thereby producing $V_{out+}$ and $V_{out-}$.

With the configuration of FIG. 14, the structure including the peak sensing circuits 3, 4 and median output circuits 5, 6 functions as an offset compensating section. The first level comparison circuit 7 functions as an amplitude limit amplifier section. The structure including the second level comparison circuit 8 and adder circuit 9, functions as a DC level reproducing section.

The offset compensating section and the amplitude limit amplifier section operate in the same way as in the first embodiment. The operation of the DC level reproducing section will be described below.

The DC level reproducing section in the embodiment of FIG. 14 will be described by reference to FIGS. 15A to 15F.

Figure 15A:
FIGS. 15A to 15F is a timing waveform diagram to help explain the operation principle of the offset compensating section and amplitude limit amplifying section in the tenth embodiment.
Figure 15B:
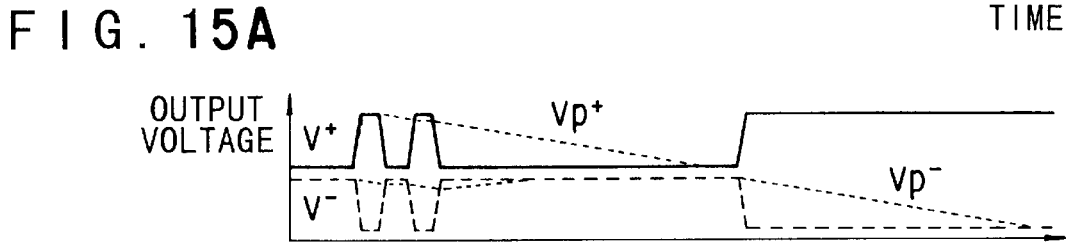
Figure 15C:
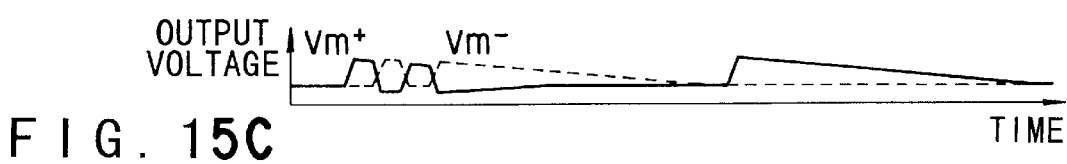
Figure 15D:
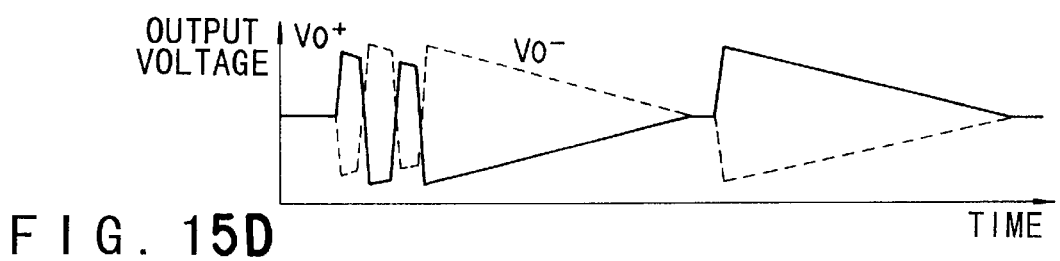
Figure 15E:
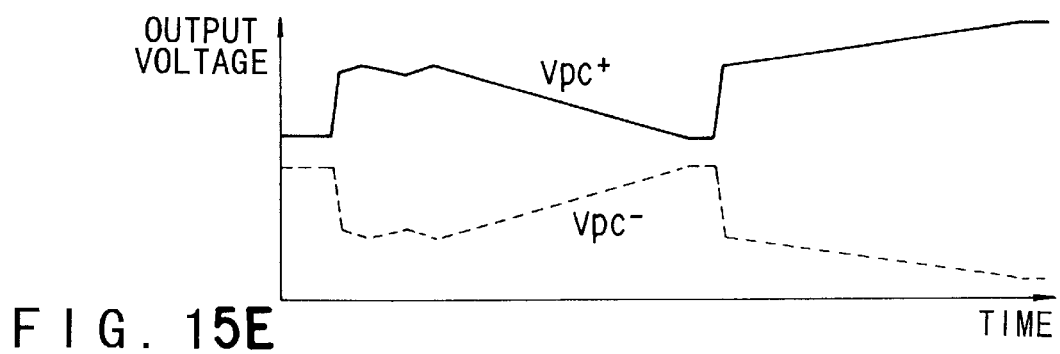
Figure 15F:
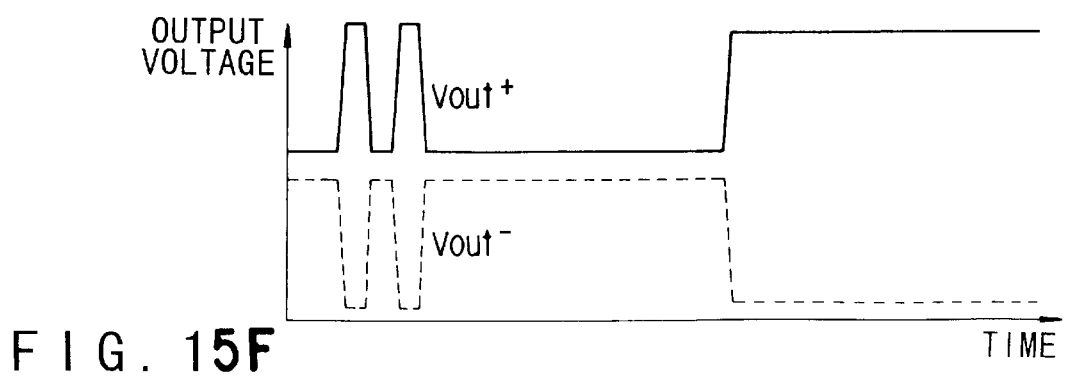

FIGS. 15A to 15F are timing waveform diagrams to help explain the operation principle of the tenth embodiment. FIG. 15A shows the power level change of the input optical signal Pin; FIG. 15B shows the level change of the positive phase output $V_+$ and opposite phase output $V_-$ of the preamplifier 2 and the level change of the peak sensing outputs $V_{p+}$ and $V_{p-}$ of the peak sensing circuits 3 and 4, respectively; FIG. 15C shows the level change of the median output $V_{m+}$ and $V_{m-}$ of the median output circuits 5, 6; FIG. 15D shows the level change of the outputs $V_{o+}$ and $V_{o-}$ of the first level comparison circuit 7; FIG. 15E shows the level change of the outputs $V_{pc+}$ and $V_{pc-}$ of the second level comparison circuit 8; and FIG. 15F shows the level change of the outputs $V_{out+}$ and $V_{out-}$ of the adder circuit 9.

When fluctuations in the marking rate of the input signal or the continuation of the same symbols causes the output $V_{p+}$ of the peak sensing circuit 3 or the output $V_{p-}$ of the peak value sensing circuit 4 to fluctuate, accurate offset compensation cannot be carried out as seen from FIG. 15C. As a result, comparison and amplification at the level comparison circuit 7 will contribute to duty deterioration or erroneous symbols as shown in FIG. 15D. In this case, even when a multistage structure is used as shown in FIG. 11, variations in the outputs $V_{p+}$ and $V_{p-}$ of the peak sensing circuits 3, 4 cannot be removed.

To overcome this problem, the configuration of the tenth embodiment adds the outputs $V_{pc+}$ and $V_{pc-}$ of the level comparison circuit 8 of FIG. 15E to the outputs $V_{o+}$ and $V_{o-}$ of the level comparison circuit 7 of FIG. 15D, thereby producing the outputs $V_{out+}$ and $V_{out-}$ of the adder circuit 9 from which the variations in the outputs $V_{p+}$ and $V_{p-}$ of the peak sensing circuits 3, 4 have been removed, as shown in FIG. 15F.

With this configuration, even when fluctuations in the marking rate or the continuation of the same symbols cause the outputs $V_{p+}$ and $V_{p-}$ of the peak sensing circuits 3, 4 to fluctuate, resistance to fluctuations in the marking rate and resistance to the continuations of the same symbols are improved, because the DC level reproducing section removes fluctuations in the DC component.

Figure 16:
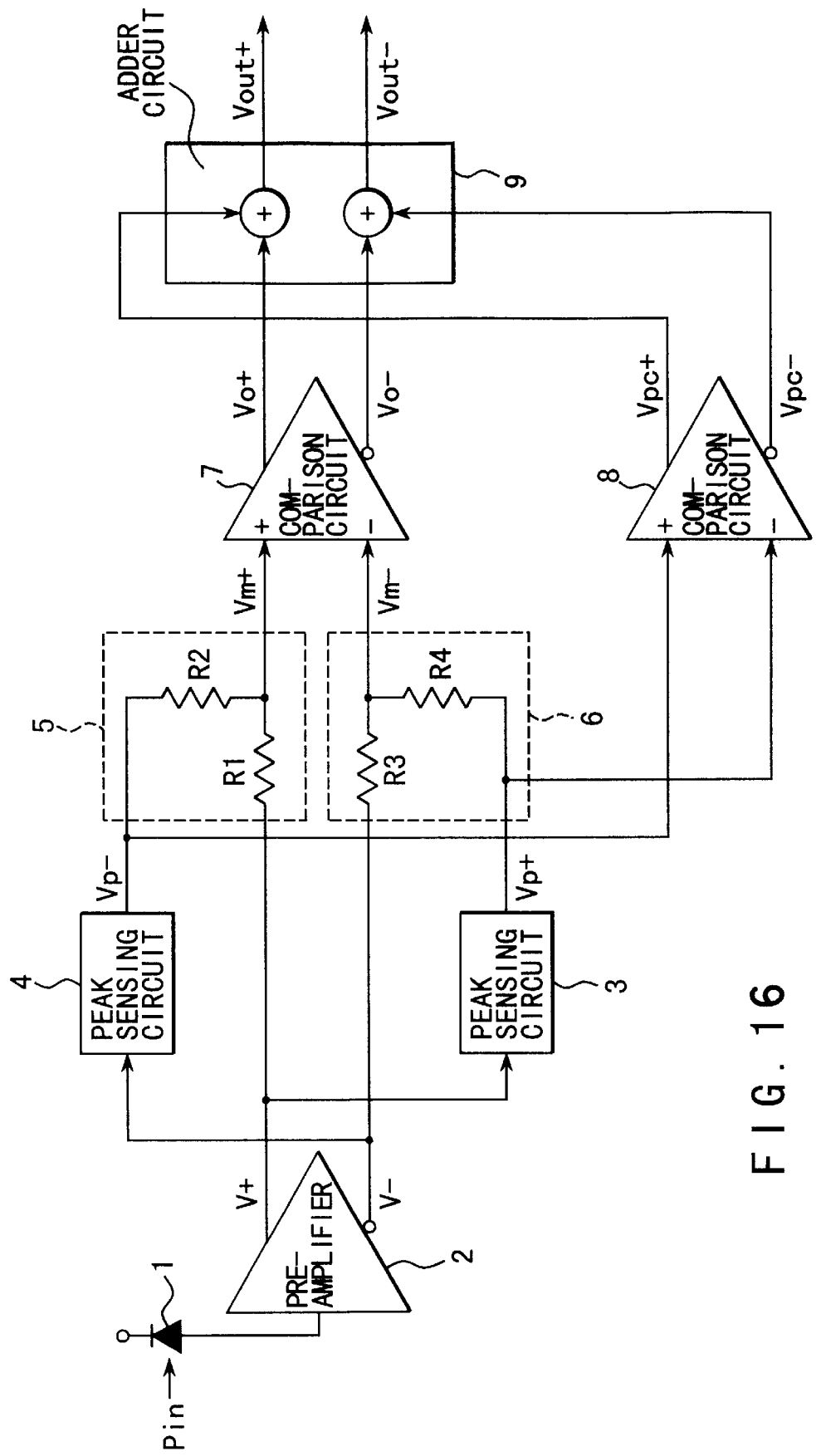
FIG. 16 is a block diagram of a digital optical receiver circuit according to a eleventh embodiment of the present invention.

FIG. 16 shows the configuration of a digital optical receiver circuit according to a eleventh embodiment of the present invention. In the optical receiver circuit, the first and second median output circuits 5, 6 in the tenth embodiment of FIG. 14 are composed of resistance division circuits consisting of resistors R1, R2, R3, and R4. It is assumed that the resistors R1 to R4 have the following values: R1=R2 and R3=R4. With this configuration, the median output circuits 5, 6 can be realized easily.

Figure 17:
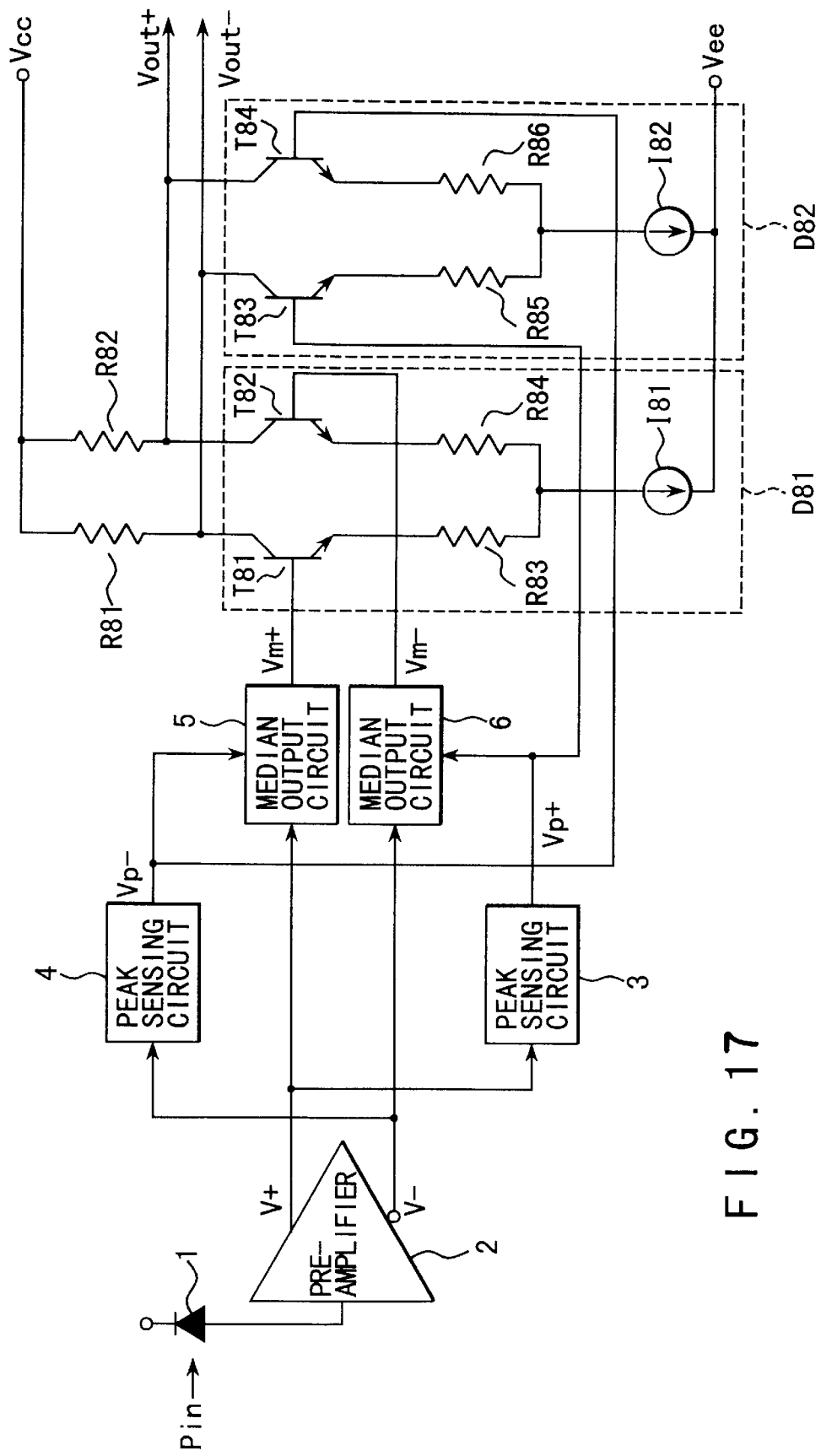
FIG. 17 is a block diagram of a digital optical receiver circuit according to an twelfth embodiment of the present invention.

FIG. 17 shows the configuration of a digital optical receiver circuit according to an twelfth embodiment of the present invention. In the optical receiver circuit, the amplitude limit amplifier section and DC level reproducing section are composed of a current-addition-type differential circuit pair made up of a first differential circuit D81 using the outputs $V_{m+}$ and $V_{m-}$ of the median output circuits 5, 6 as inputs and a second differential circuit D82 using the outputs $V_{p+}$ and $V_{p-}$ of the peak sensing circuits 3, 4 as inputs, a first collector resistor R81, and a second collector resistor R82.

Specifically, the first differential circuit D81 is composed of a first transistor T81 whose base is supplied with the output $V_{m+}$ of the median output circuit 5, a second transistor T82 whose base is supplied with the output $V_{m-}$ of the median output circuit 6, a resistor R83 one end of which is connected to the emitter of the first transistor T81, a resistor R84 one end of which is connected to the emitter of the second transistor T82, and a first current source I81 connected to the other end of each of the resistors R83, R84.

The second differential circuit D82 is composed of a third transistor T83 whose base is supplied with the output $V_{p+}$ of the peak sensing circuit 3, a fourth transistor T84 whose base is supplied with the output $V_{p-}$ of the peak sensing circuit 4, a resistor R85 one end of which is connected to the emitter of the third transistor T83, a resistor R86 one end of which is connected to the emitter of the fourth transistor T84, and a second current source I82 connected to the other end of each of the resistors R85, R86.

The collector of the first transistor T81 and that of the third transistor T83 are connected to a first common collector resistor R81. The collector of the second transistor T82 and that of the fourth transistor T84 are connected to a second common collector resistor R82.

It is assumed that the resistors R81, R82, R83, R84, R85, and R86 have the following resistance values: R81=R82, R83=R84=(½)×R85=(½)×R86.

This configuration facilitates the realization of the DC level reproducing section and produces a similar effect to the embodiment of FIG. 14.

Figure 18:
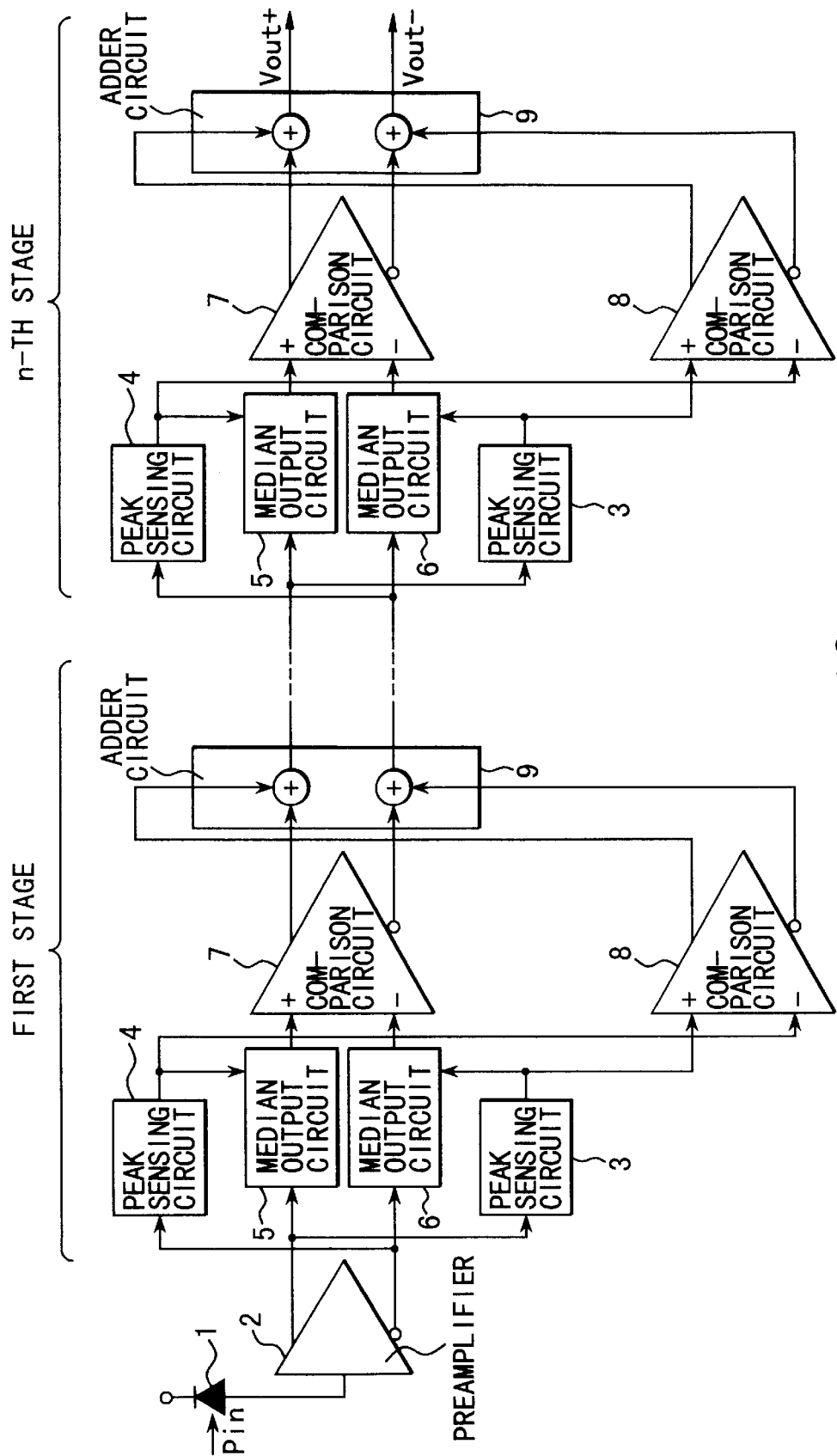
FIG. 18 is a block diagram of a digital optical receiver circuit according to an thirteenth embodiment of the present invention.

FIG. 18 shows the configuration of a digital optical receiver circuit according to an thirteenth embodiment of the present invention. In the optical receiver circuit, multiple stages of a set of the offset compensating section, amplitude limit amplifier section, and DC level reproducing section in the tenth embodiment are connected (in FIG. 18, n stages), and the gain of the level comparison circuit 7 at each stage is decreased to widen the input voltage range for linear operation.

With this configuration, the offset compensating section and amplitude limit amplifier section at each stage compare and amplify only the AC component of the input signal in the linear operation range of the level comparison circuit 7 and the DC level reproducing section removes fluctuations in the DC component. This makes it possible to supply the signal free from fluctuations in the DC component to the offset compensating section at the next stage.

As a result, even when accurate offset compensation cannot be carried out because fluctuations in the marking rate or the continuation of the same symbols have caused the outputs $V_{p+}$ and $V_{p-}$ of the peak sensing circuits 3, 4 to fluctuate, the offset compensating sections at the following and later stages can perform offset compensation, which enables efficient offset compensation and widens the input dynamic range.

With the thirteenth embodiment, even when the marking rate has fluctuated or the same symbols have continued, a high-speed burst signal with a wide dynamic range can be amplified accurately. The operating points of the outputs $V_{out+}$ and $V_{out-}$ of the adder circuit 9 do not coincide with each other, so they cannot be identified. This problem can be solved by the configuration of a fourteenth embodiment of the present invention.

Figure 19:
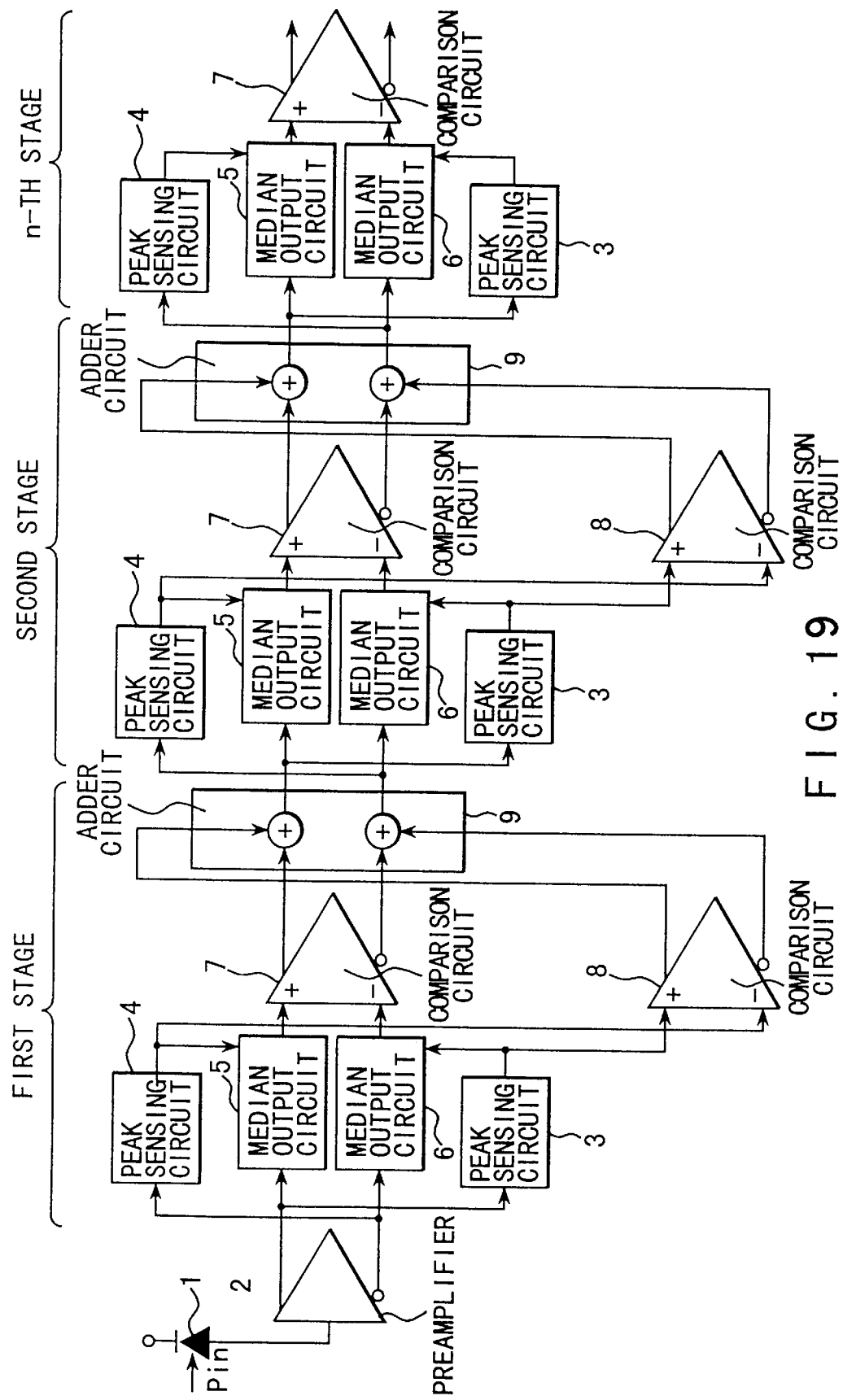
FIG. 19 is a block diagram of a digital optical receiver circuit according to a fourteenth embodiment of the present invention.

FIG. 19 shows the configuration of a digital optical receiver circuit according to a fourteenth embodiment of the present invention. The optical receiver circuit is such that in the configuration composed of multiple stages of a set of the offset compensating section, amplitude limit amplifier section, and DC level reproducing section in the thirteenth embodiment, the final stage is replaced with the offset compensating section and amplitude limit amplifier section in the tenth embodiment of FIG. 14.

With this configuration, a multistage connection (1 to n–1 stages) of offset compensating sections, amplitude limit amplifier sections, and DC level reproducing sections amplifies a wide dynamic range input signal to a level at which the input signal is sufficiently resistant to fluctuations in the marking rate and the continuation of the same symbols. The offset compensating section and amplitude limit amplifier section at the final stage (the n-th stage) identify the signal, thereby making it possible to identify the wide dynamic range high-speed burst signal instantaneously.

While in the fourteenth embodiment, only the final stage is replaced with the offset compensating section and amplitude limit amplifier section of FIG. 14, a plurality of stages from the final stage may be replaced in a similar manner.

Figure 20:
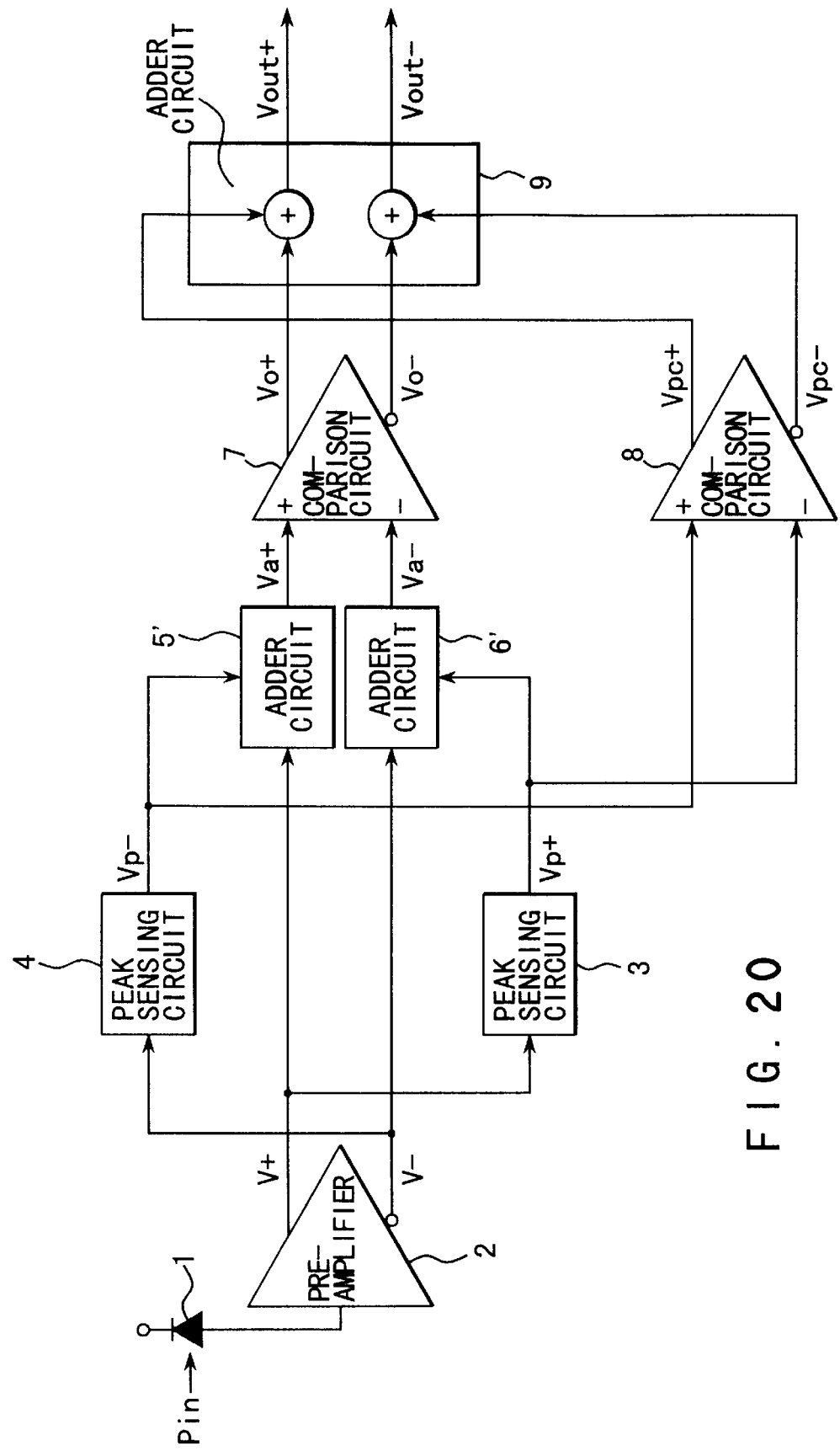
FIG. 20 is a block diagram of a digital optical receiver circuit according to a fifteenth embodiment of the present invention.

FIG. 20 shows the configuration of a digital optical receiver circuit according to a fifteenth embodiment of the present invention. In the optical receiver circuit, an offset compensating section is constructed by replacing the first and second median output circuits 5, 6 in the tenth embodiment of FIG. 14 with a first and second adder circuits 5', 6'. The gain of the second level comparison circuit 8 is determined to be the product of the gain of either the second or third adder circuit 5', 6' and the gain of the first level comparison circuit 7.

With the configuration of the embodiment, the output $V_{a+}$ of the second adder circuit 5' and the output $V_{a-}$ of the third adder circuit 6' are complementary signals that are the same in amplitude and DC level, which enables the DC level reproducing section to remove fluctuations in the DC component. As a result, the fifteenth embodiment operates in a similar manner to the embodiment of FIG. 14 and produces a similar effect.

Figure 21:
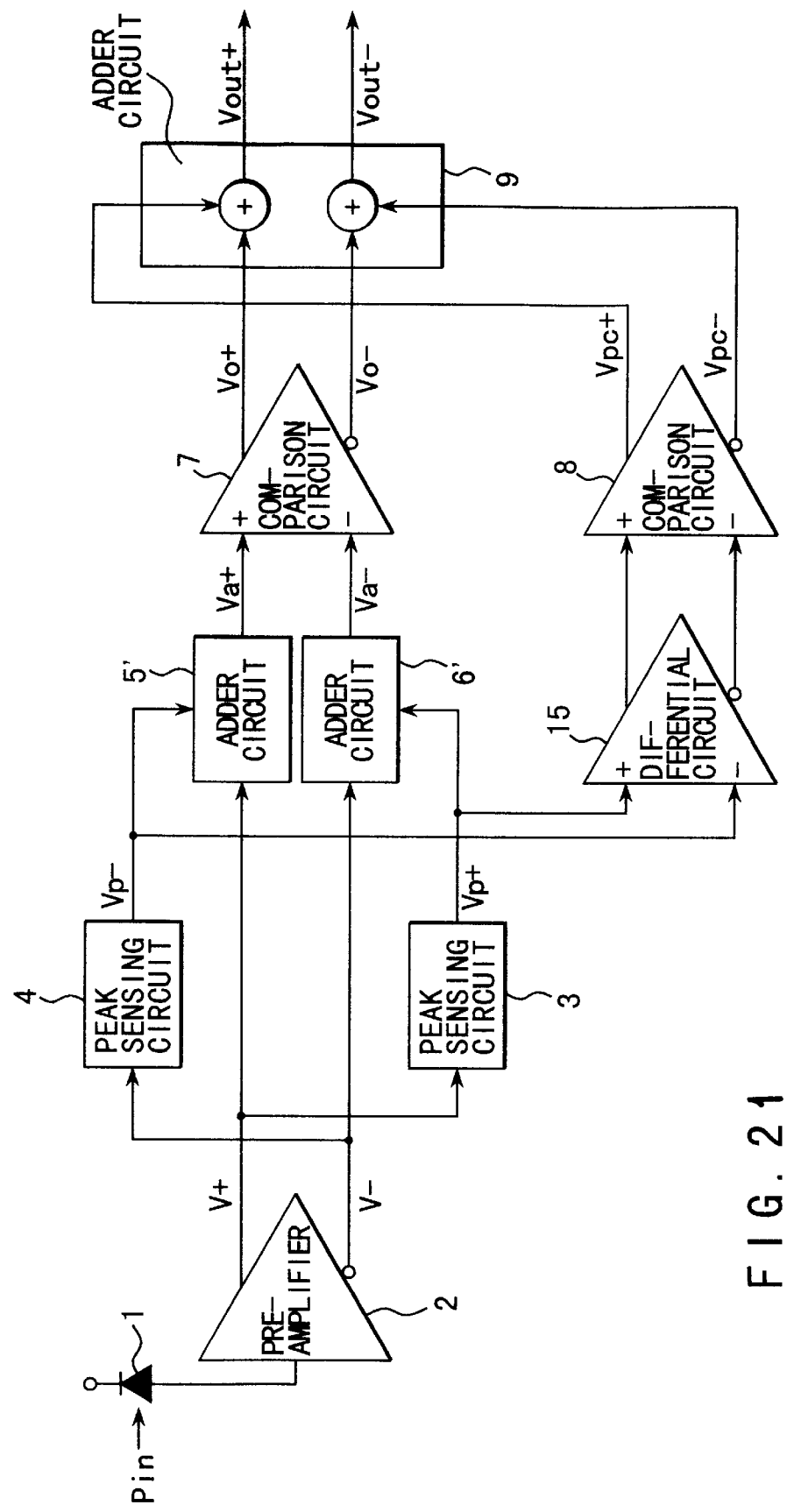
FIG. 21 is a block diagram of a digital optical receiver circuit according to a sixteenth embodiment of the present invention.

FIG. 21 shows the configuration of a digital optical receiver circuit according to a sixteenth embodiment of the present invention. The optical receiver circuit is such that the embodiment of FIG. 20 is provided with a third differential circuit 15 that has the same gain as those of the second and third adder circuits 5', 6' and outputs the difference between $V_{p+}$ and $V_{p-}$ of the peak sensing circuits 3, 4, and the gain of the second level comparison circuit 8 is determined to be the same as that of the first level comparison circuit 7. As a result, the sixteenth embodiment operates in a similar manner to the embodiment of FIG. 14 and produces a similar effect.

Figure 22:
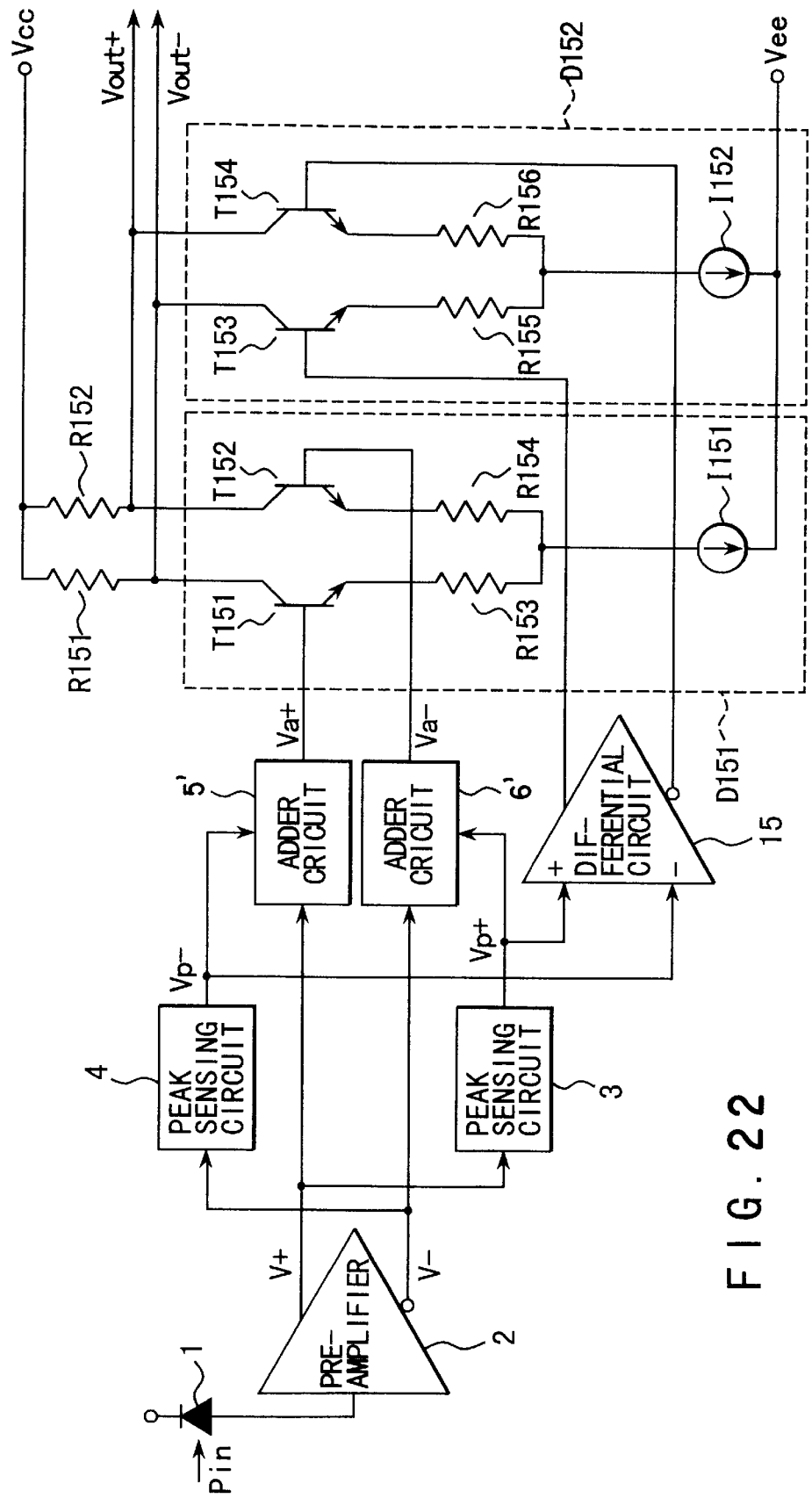
FIG. 22 is a block diagram of a digital optical receiver circuit according to an seventeenth embodiment of the present invention.

FIG. 22 shows the configuration of a digital optical receiver circuit according to an seventeenth embodiment of the present invention. In the optical receiver circuit, the amplitude limit amplifier section and the DC level reproducing section in the sixteenth embodiment of FIG. 21 are composed of a current addition-type differential circuit pair made up of a first differential circuit D151 that receives the outputs $V_{a+}$ and $V_{a-}$ of the offset compensating section, a second differential circuit D152 that receives the outputs $V_{p+}$ and $V_{p-}$ of the peak sensing circuits 3, 4, a first collector resistor R151, and a second collector resistor R152.

The first differential circuit D151 is composed of a first transistor T151 whose base is supplied with the output $V_{a+}$ of the offset compensating section, a second transistor T152 whose base is supplied with the output $V_{a-}$ of the offset compensating section, a resistor R153 one end of which is connected to the emitter of the first transistor T151, a resistor R154 one end of which is connected to the emitter of the second transistor T152, and a first current source I151 connected to the other end of each of the resistors R153, R154.

The second differential circuit D152 is composed of a third transistor T153 whose base is supplied with the output $V_{p+}$ of the peak sensing circuit 3, a fourth transistor T154 whose base is supplied with the output $V_{p-}$ of the peak sensing circuit 4, a resistor R155 one end of which is connected to the emitter of the third transistor T153, a resistor R156 one end of which is connected to the emitter of the fourth transistor T154, and a second current source I152 connected to the other end of each of the resistors R155, R156.

The collector of the first transistor T151 and that of the third transistor T153 are connected to a first common collector resistor R151. The collector of the second transistor T152 and that of the fourth transistor T154 are connected to a second common collector resistor R152.

It is assumed that the resistors R151, R152, R153, R154, R155, and R156 have the following resistance values: R151=R152, R153=R154=R155=R156.

This configuration facilitates the realization of the DC level reproducing section, operates in a similar manner to the embodiment of FIG. 14 and therefore produces a similar effect.

FIG. 23 shows the configuration of a digital optical receiver circuit according to a eighteenth embodiment of the present invention. In the optical receiver circuit, the offset compensating section in the tenth embodiment of FIG. 14 is composed of peak sensing circuits 3 and 4, a first differential circuit 13 that outputs the difference between the positive phase output $V_+$ of the preamplifier 2 and the output $V_{p+}$ of the peak sensing circuit 3, a second differential circuit 14 that outputs the difference between the opposite phase output $V_-$ of the preamplifier 2 and the output $V_{p-}$ of the peak sensing circuit 4. The gain of the second level comparison circuit 8 is determined to be the product of the gain of either the first or second differential circuit 13, 14 and the gain of the first level comparison circuit 7.

With the configuration of the embodiment, the output $V_{d+}$ of the first differential circuit 13 and the output $V_{d-}$ of the second differential circuit 14 are complementary signals that are the same in amplitude and DC level, which enables the DC level reproducing section to remove fluctuations in the DC component. As a result, the eighteenth embodiment operates in a similar manner to the embodiment of FIG. 14 and produces a similar effect.

FIG. 24 shows the configuration of a digital optical receiver circuit according to a nineteenth embodiment of the present invention. In the optical receiver circuit, the offset compensating section in the tenth embodiment of FIG. 14 is composed of peak sensing circuits 3 and 4, a first differential circuit D111 that uses the positive phase output $V_+$ of the preamplifier 2 and the output $V_{p+}$ of the peak sensing circuit 3 as inputs, a second differential circuit D112 that uses the opposite phase output $V_-$ of the preamplifier 2 and the output $V_{p-}$ of the peak sensing circuit 4 as inputs, and a current addition-type differential circuit pair made up of a first collector resistor R111 and a second collector resistor R112. The gain of the second level comparison circuit 8 is determined to be the product of the gain of the differential circuit composed of the first and second collector resistors R111, R12 and the gain of the first level comparison circuit 7.

The first differential circuit D111 is composed of a first transistor T111 whose base is supplied with the positive phase output $V_+$ of the preamplifier 2, a second transistor T112 whose base is supplied with the output $V_{p+}$ of the peak sensing circuit 3, a resistor R113 one end of which is connected to the emitter of the first transistor T111, a resistor R114 one end of which is connected to the emitter of the second transistor T112, and a first current source I111 connected to the other end of each of the resistors R113, R114.

The second differential circuit D112 is composed of a third transistor T113 whose base is supplied with the output $V_{p-}$ of the peak sensing circuit 4, a fourth transistor T114 whose base is supplied with the opposite phase output $V_-$ of the preamplifier 2, a resistor R115 one end of which is connected to the emitter of the third transistor T113, a resistor R116 one end of which is connected to the emitter of the fourth transistor T114, and a second current source I112 connected to the other end of each of the resistors R115, R116.

The collector of the first transistor T111 and that of the third transistor T113 are connected to a first common collector resistor R111. The collector of the second transistor T112 and that of the fourth transistor T114 are connected to a second common collector resistor R112.

It is assumed that the resistors R111, R112, R113, R114, R115, and R116 have the following resistance values: R111=R112, R113=R114=R115=R116.

With the configuration of the embodiment, the positive phase output $V_{dd+}$ and opposite output $V_{dd-}$ of the current addition-type differential circuit pair are complementary signals that are the same in amplitude and DC level, which enables the DC level reproducing section to remove fluctuations in the DC component. As a result, the nineteenth embodiment operates in a similar manner to the embodiment of FIG. 14 and produces a similar effect.

FIG. 25 shows the configuration of a digital optical receiver circuit according to a twentieth embodiment of the present invention. In the optical receiver circuit, the offset compensating section in the tenth embodiment is composed of peak sensing circuits 3 and 4, a first differential circuit D121 that uses the positive phase output $V_+$ and opposite phase output $V_-$ of the preamplifier 2 as inputs, a second differential circuit D122 that uses the output $V_{p-}$ of the peak sensing circuit 4 and the output $V_{p+}$ of the peak sensing circuit 3 as inputs, and a current addition-type differential circuit pair made up of a first collector resistor R121 and a second collector resistor R122. The gain of the second level comparison circuit 8 is determined to be the product of the gain of the differential circuit composed of the first differential circuit D121 and the first and second collector resistors R121, R122 and the gain of the first level comparison circuit 7.

The first differential circuit D121 is composed of a first transistor T121 whose base is supplied with the positive phase output $V_+$ of the preamplifier 2, a second transistor T122 whose base is supplied with the opposite phase output $V_-$ of the preamplifier 2, a resistor R123 one end of which is connected to the emitter of the first transistor T121, a resistor R124 one end of which is connected to the emitter of the second transistor T122, and a first current source I121 connected to the other end of each of the resistors R123, R124.

The second differential circuit D122 is composed of a third transistor T123 whose base is supplied with the output $V_{p-}$ of the peak sensing circuit 4, a fourth transistor T124 whose base is supplied with the output $V_{p+}$ of the peak sensing circuit 3, a resistor R125 one end of which is connected to the emitter of the third transistor T123, a resistor R126 one end of which is connected to the emitter of the fourth transistor T124, and a second current source I122 connected to the other end of each of the resistors R125, R126.

The collector of the first transistor T121 and that of the third transistor T123 are connected to a first common collector resistor R121. The collector of the second transistor T122 and that of the fourth transistor T124 are connected to a second common collector resistor R122.

It is assumed that the resistors R121, R122, R123, R124, R125, and R126 have the following resistance values: R121=R122, R123=R124=R125=R126.

With the configuration of the embodiment, the positive phase output $V_{dd+}$ and opposite output $V_{dd-}$ of the current addition-type differential circuit pair are complementary signals that are the same in amplitude and DC level, which enables the DC level reproducing section to remove fluctuations in the DC component. As a result, the twentieth embodiment operates in a similar manner to the embodiment of FIG. 14 and produces a similar effect.

Figure 26:
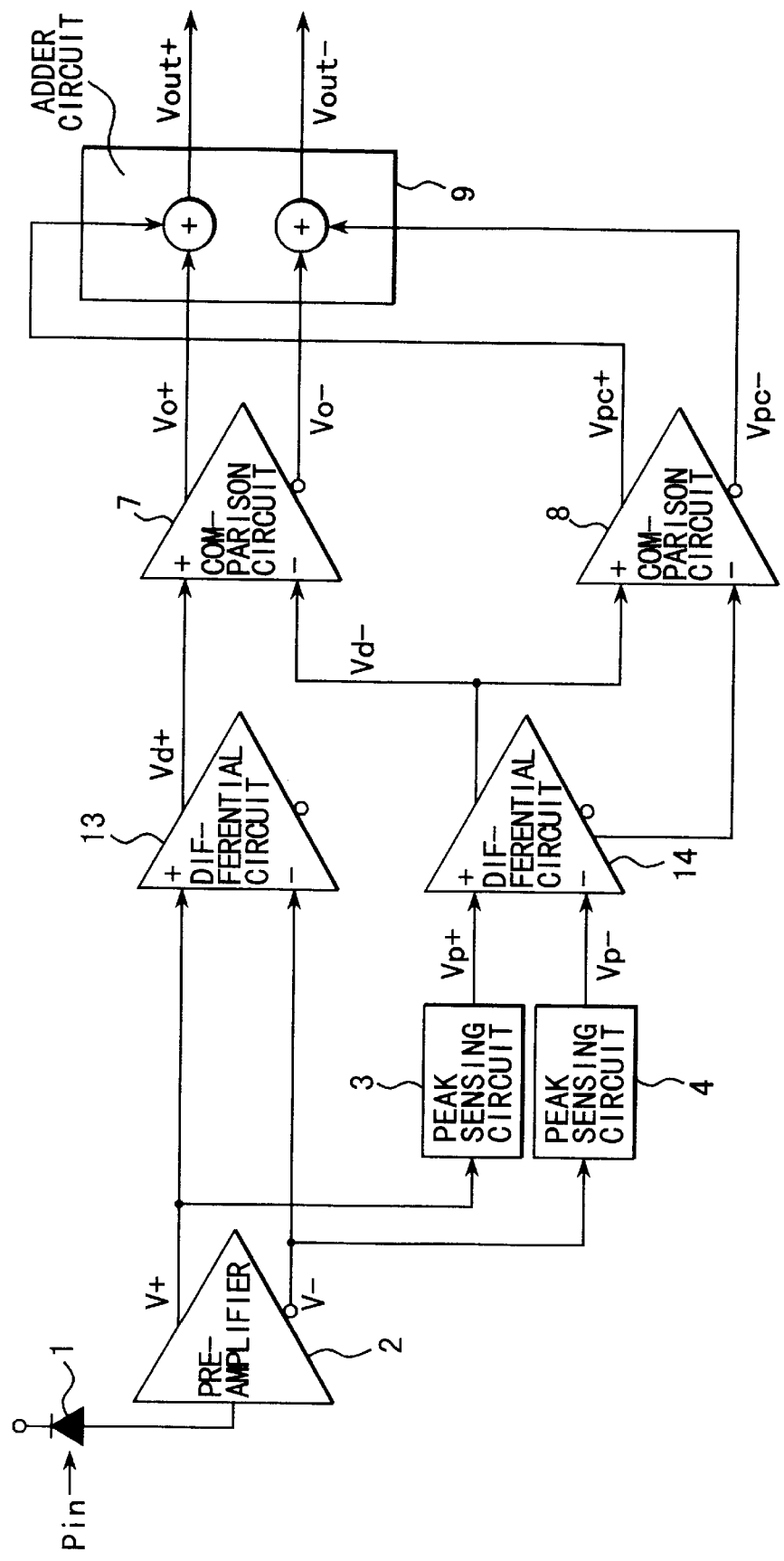
FIG. 26 is a block diagram of a digital optical receiver circuit according to a 21-th embodiment of the present invention.

FIG. 26 shows the configuration of a digital optical receiver circuit according to a 21-th embodiment of the present invention. In the optical receiver circuit, the offset compensating section in the tenth embodiment of FIG. 14 is replaced with an identification level sensing section composed of peak sensing circuits 3 and 4, a first differential circuit 13 that outputs the difference between the positive phase output $V_+$ and opposite phase output $V_-$ of the preamplifier 2, a second differential circuit D122 that has the same gain as that of the first differential circuit 12 and outputs the difference between the output $V_{p+}$ of the peak sensing circuit 3 and the output $V_{p-}$ of the peak sensing circuit 4. The output of the second differential circuit 14 is used as the input to the second level comparison circuit 9. The gain of the second level comparison circuit 8 is determined to be the same as that of the first level comparison circuit 7.

With the configuration of the 21-th embodiment, the output $V_{d-}$ of the second differential circuit 14 is at the mid-level of the amplitude of the output $V_{d+}$ of the first differential circuit 13. Therefore, by comparing $V_{d+}$ with $V_{d-}$ at the first differential circuit 7, it is possible to output the reception signals $V_{o+}$, $V_{o-}$, starting with the first bit in the burst signal, without duty fluctuations caused by the output offset voltage of the preamplifier 2 or the deterioration of the reception sensitivity. This enables the DC level reproducing section to remove fluctuations in the DC component. As a result, the 21-th embodiment operates in a similar manner to the embodiment of FIG. 14 and produces a similar effect.

In the 21-th embodiment, the outputs $V_{p+}$, $V_{p-}$ of the first and second peak sensing circuits 3, 4 may be used as the inputs to the second level comparison circuit 8, and the gain of the second level comparison circuit 8 may be the product of the gain of either the first or second differential circuit 13, 14 and the gain of the first level comparison circuit 7.

Furthermore, the configuration of the embodiment of FIG. 23 may be provided with a third differential circuit 15 that has the same gain as those of the first and second differential circuits 13, 14, with the gain of the second level comparison circuit 8 being the same as that of the first level comparison circuit 7. With this configuration, too, the embodiment operates in a similar manner to the embodiment of FIG. 14 and produces a similar effect.

Still furthermore, the configuration of each of the embodiments of FIGS. 24 and 25 may be provided with a third differential circuit 15 that has the same gain as that of a differential circuit composed of the first differential circuit D111 or D121 and the first and second collector resistors, with the gain of the second level comparison circuit 8 being the same as that of the first level comparison circuit 7. With this configuration, too, the embodiment operates in a similar manner to the embodiment of FIG. 14 and produces a similar effect.

Furthermore, the configuration of each of the embodiments of FIGS. 23 to 26 facilitates the realization of the DC level reproducing section of the embodiment of FIG. 22, operates in a similar manner to the embodiment of FIG. 14, and therefore produces a similar effect.

Moreover, with the configuration composed of multiple stages of a set of the offset compensating section or identification level sensing section, the amplitude limit amplifier section, and the DC level reproducing section in each of the embodiments of FIGS. 16, 17 and 20 to 26, the embodiment operates in a similar manner to the embodiment of FIG. 18 and therefore produces a similar effect.

Still furthermore, with the configuration composed of multiple stages of a set of the offset compensating section or the identification level sensing section, the amplitude limit amplifier section, and the DC level reproducing section, the final stage or a plurality of stages including the final stage may be replaced with the offset compensating section or identification level sensing section and the amplitude limit amplifier section in each of the embodiments in FIGS. 14, 16, 17 and 20 to 26. With this configuration, too, the embodiment operates in a similar manner to the embodiment of FIG. 19 and therefore produces a similar effect.

Still furthermore, when a feedforward-type offset compensating section or identification level sensing section with peak sensing circuits 3, 4 is used except for the offset compensating section of identification level sensing section in each of the above embodiments, use of a DC level reproducing section enables the present embodiment to operate in a similar manner to each of the embodiments of FIGS. 14, 18, and 19. Therefore, the present embodiment produces a similar effect.

With the configuration of each of the above embodiments, however, when a small amplitude burst signal has arrived immediately after a large amplitude burst signal, the charge held in the peak sensing circuits 3, 4 cannot be discharged instantaneously, probably resulting in a faulty operation of the receiver circuit. This problem will be solved by a 22-th embodiment of the present invention.

Figure 27:
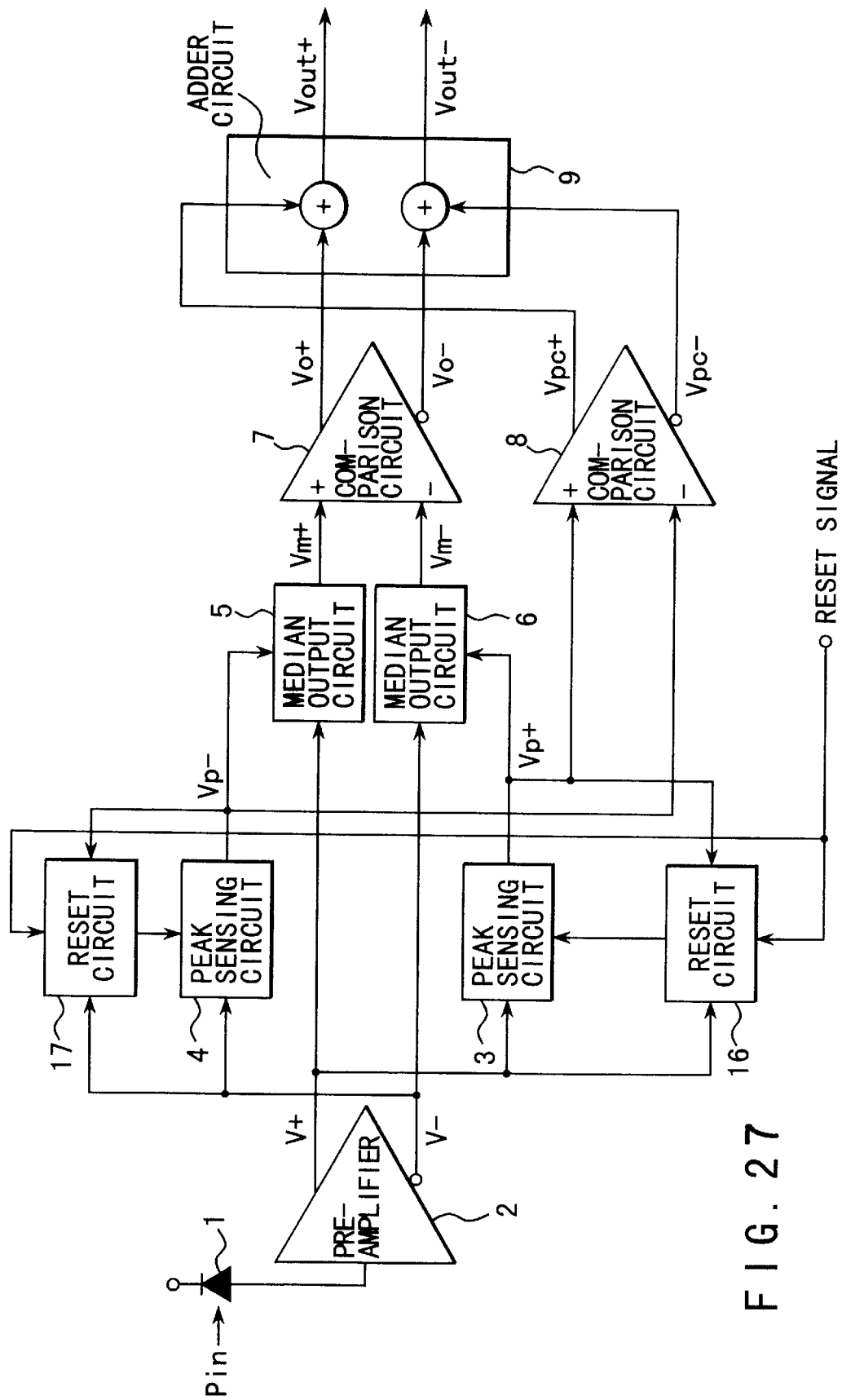
FIG. 27 is a block diagram of a digital optical receiver circuit according to a 22-th embodiment of the present invention.

FIG. 27 shows the configuration of a digital optical receiver circuit according to a 22-th embodiment of the present invention. The optical receiver circuit is such that a first and second reset circuits 16, 17 that reset the first and second peak sensing circuits 3, 4, respectively, are added to the tenth embodiment of FIG. 14. Receiving the reset signal, the reset circuits 16, 17 return the peak sensing circuits 3, 4 to the initial state instantaneously.

With the above configuration, even when a small amplitude burst signal is inputted immediately after a large amplitude burst signal, identification can be made, starting with the first bit, by supplying a reset signal to the reset circuits 16, 17 after the completion of the burst signal.

Figure 28:
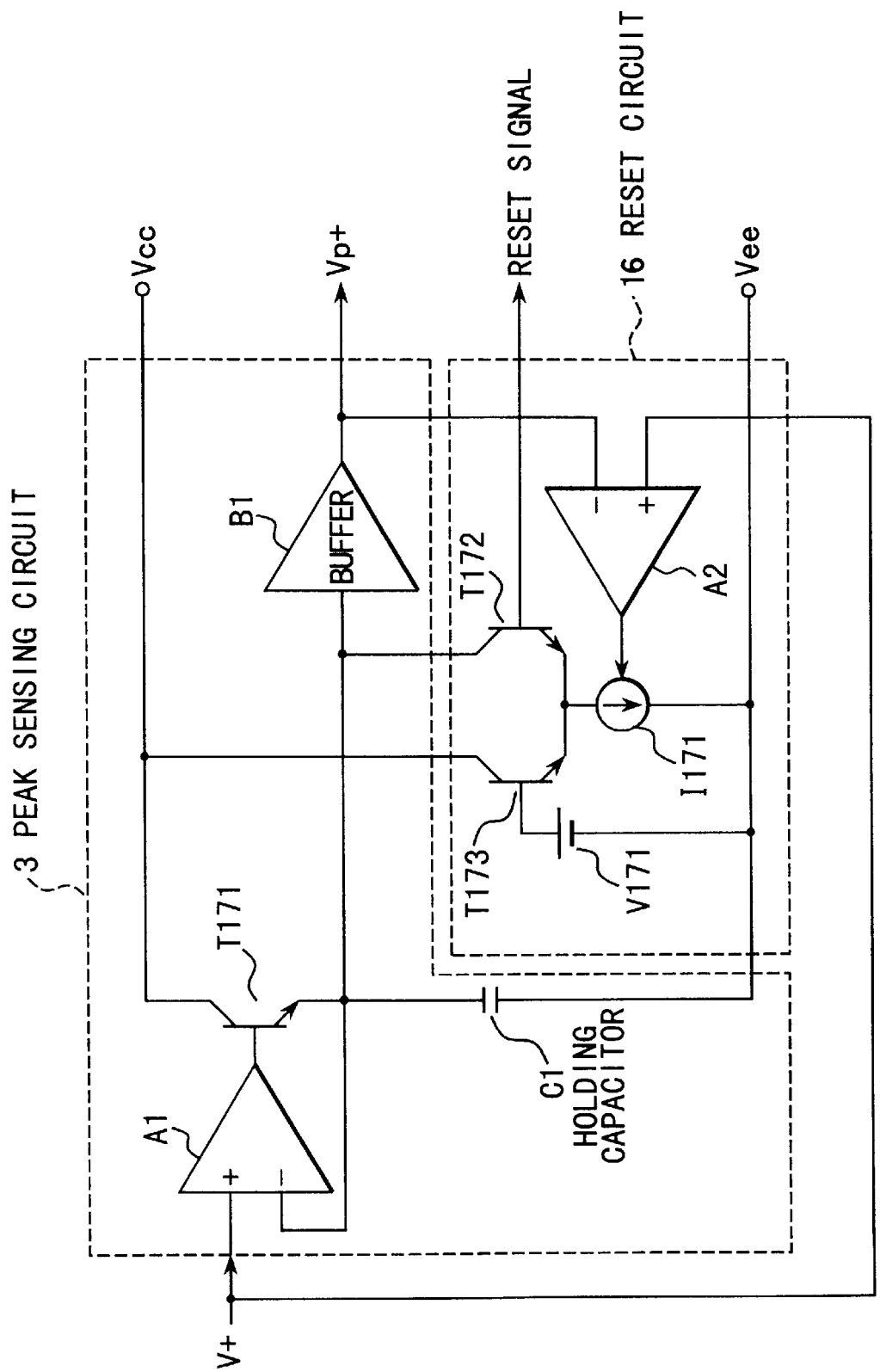
FIG. 28 is a circuit diagram of the first peak sensing circuit and the first reset circuit in the 22-th embodiment.

FIG. 28 shows a concrete configuration of the first peak sensing circuit 3 and the first reset circuit 16.

In FIG. 28, the peak sensing circuit 3 comprises a differential amplifier A1, a rectification transistor T171, a holding capacitor C1, and an output buffer B1. The input voltage $V_+$ is applied to the holding capacitor C1 via the differential amplifier A1 and rectification transistor T171, thereby charging the holding capacitor C1. The charging voltage is supplied from a buffer B1 as $V_{p+}$. The differential amplifier A1 and rectification transistor T171 constitutes a voltage follower, thereby achieving high accuracy through the loop gain of the voltage follower.

Specifically, when the input signal $V_+$ is at the high level, the holding capacitor C1 is charged. When the input signal $V_-$ is at the low level, the input and output are made high impedance, which cuts off the discharging path of the charge held in the holding capacitor C1, thereby sensing and holding the peak.

The reset circuit 16 comprises a current switching circuit composed of transistors T172, T173, a reference voltage source V171, and a voltage control current source I171, and a differential amplifier A2 that outputs the difference between the input and output signals $V_+$ and $V_{p+}$ of the peak sensing circuit 3.

In the reset circuit 16, the transistor T172 is connected in parallel with the holding capacitor C1 of the peak sensing circuit 3. When a reset signal is supplied to the base of the transistor T172, the transistor T172 turns on, discharging the charge held in the holding capacitor C1 instantaneously. When the output voltage of the differential amplifier A2 is used to control the current value of the voltage control current source I171, this enables the collector current of the transistor T172 to be controlled in proportion to the amount of charge held in the holding capacitor C1. Namely, discharging can be done accurately, regardless of the magnitude of the input signal.

With the configuration of each of the embodiments of FIGS. 16 to 26, use of the reset circuits 16, 17 that reset the peak sensing circuits 3, 4 enables the present embodiment to operate in a similar manner to the embodiment of FIG. 27.

In the above embodiment, explanation has been given using the first and second peak sensing circuits 3, 4. The first and second peak sensing circuits 3, 4 may be replaced with a first and second bottom value sensing circuits, respectively. This configuration operates in a similar manner to each of the above embodiments and therefore produces a similar effect, because the peak values are just replaced with the bottom values.

While in each of the above embodiments, a photodiode is used as a light-receiving element, the photodiode may be replaced with an avalanche photodiode or an electric field absorption semiconductor optical element. In this case, too, a similar operation can be realized.

The present invention is not limited to a digital optical receiver circuit. Rather, it can be applied to a receiver circuit for use in a digital signal transfer system which uses radio waves or metal cables for transferring digital signals.

As described until now, with the present invention, it is possible to provide a digital signal receiver circuit capable of identifying a burst signal, starting with the first bit in the burst signal, without causing the degradation of duty and the deterioration of the reception sensitivity resulting from the dark current of the light receiving element, fluctuations in the output offset voltage of the preamplifier, fluctuations in the marking rate of the input signal, or the continuation of the same symbols.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A digital signal receiver circuit comprising:
   a preamplifier for generating a positive phase signal and the opposite phase signal from an input digital signal;
   a first level sensing circuit for sensing and holding either the peak value or the bottom value of the positive phase output of said preamplifier;
   a second level sensing circuit for sensing and holding the same level value as that of said first level sensing circuit from the peak value or bottom value of the opposite phase output of said preamplifier;
   a first median output circuit for outputting the median between the positive phase output of said preamplifier and the output of said second level sensing circuit;
   a second median output circuit for outputting the median between the opposite phase output of said preamplifier and the output of said first level sensing circuit; and
   a first level comparison circuit for comparing the output of said first median output circuit with the output of said second median output circuit and outputting a signal voltage with a constant amplitude within a specific input voltage range, wherein
   said first and second level sensing circuits, first and second median output circuits, and said first level comparison circuit constitute an offset compensating section that performs the offset compensation of the DC level difference of the output of said preamplifier, and
   said first level comparison circuit constitutes an amplitude limit amplifier section that compares and amplifies the output of said offset compensating section.

2. A digital signal receiver circuit according to claim 1, wherein said first and second median output circuits are each composed of resistance division circuits that divide and output both inputs in the resistance ratio.

3. A digital signal receiver circuit according to claim 1, wherein said first and second median output circuits are composed of a first and second adder circuits that add both inputs and output the result.

4. A digital signal receiver circuit according to claim 1, wherein said offset compensating section further includes reset means for resetting said first and second level sensing circuits.

5. A digital signal receiver circuit according to claim 4, wherein said reset means resets said first and second level sensing circuits with the timing of each input signal.

6. A digital signal receiver circuit according to claim 1, wherein more sets of said offset compensating section and amplitude limit amplifier section are repeated in the form of multistage connection.

7. A digital signal receiver circuit according to claim 1, further comprising:
   a second level comparison circuit that has the gain half of the gain of said first level comparison circuit and that compares the output of said first level sensing circuit with the output of said second level sensing circuit and outputs a signal voltage with a constant amplitude within a specific input voltage amplitude range; and a third adder circuit that adds the output of said first level comparison circuit to the output of said second level comparison circuit, wherein said second level comparison circuit and said third adder circuit constitute a DC level reproducing section that compensates for fluctuations in the outputs of said first and second level sensing circuits.

8. A digital signal receiver circuit according to claim 7, wherein said amplitude limit amplifier section and said DC level reproducing section include:

a first and second transistors that use the outputs of said first and second median output circuits as their base inputs, respectively;

a first and second emitter resistors which have the same resistance value and one end of each of which is connected to the emitter of each of said first and second transistors, respectively;

a first current source connected to the other end of each of said first and second emitter resistors;

a third and fourth transistors that use the outputs of said first and second level sensing circuits as their base inputs, respectively;

a third and fourth emitter resistors which have the resistance value twice that of said first and second emitter resistors and one end of each of which is connected to the emitter of each of said third and fourth transistors, respectively;

a second current source connected to the other end of each of said third and fourth emitter resistors;

a first collector resistor one end of which is connected to the collector of said first transistor and the collector of said third transistor and the other end of which is applied with a power supply voltage; and a second collector resistor which has the same resistance value as that of said first collector resistor and one end of which is connected to the collector of said second transistor and the collector of said fourth transistor and the other end of which is applied with said power supply voltage, wherein the collector combined output of said first and third transistors and the collector combined output of said second and fourth transistors are determined to be reception outputs.

9. A digital signal receiver circuit according to claim 7, wherein more sets of said offset compensating section, amplitude limit amplifier section, and DC level reproducing section are repeated in the form of multistage connection.

10. A digital signal receiver circuit according to claim 7, wherein said DC level reproducing section includes a differential circuit that has the same gain as that of said first or second median output circuit and that determines the difference between the outputs of said first and second level sensing circuits and outputs the positive phase signal and opposite phase signal, and said second level comparison circuit has the same gain as that of said first level comparison circuit and compares the positive phase signal and opposite phase signal outputted from said differential circuit.

11. A digital signal receiver circuit according to claim 1, wherein said input digital signal is a photoelectric current produced by a light-receiving element.

12. A digital signal receiver circuit comprising:

a preamplifier for generating a positive phase signal and the opposite phase signal from an input digital signal;

a first level sensing circuit for sensing and holding either the peak value or the bottom value of the positive phase output of said preamplifier;

a second level sensing circuit for sensing and holding the same level value as that of said first level sensing circuit from the peak value or bottom value of the opposite phase output of said preamplifier;

a first differential circuit that determines the difference between the positive phase output of said preamplifier and the output of said first level sensing circuit and outputs the difference;

a second differential circuit that has the same gain as that of said first differential circuit and that determines the difference between the opposite phase output of said preamplifier and the output of said second level sensing circuit and outputs the difference;

a first level comparison circuit that compares the output of said first differential circuit with the output of said second differential circuit and outputs a signal voltage with a constant amplitude within a specific input voltage amplitude range;

a second level comparison circuit that has the gain equal to the product of the gain of said first or second differential circuit and the gain of said first level comparison circuit and that compares the output of said first level sensing circuit with the output of said second level sensing circuit and outputs a signal voltage with a constant amplitude within a specific input voltage amplitude range; and an adder circuit that adds the output of said first level comparison circuit to the output of said second level comparison circuit, wherein said first and second level sensing circuits, first and second differential circuits, and first level comparison circuit constitute an offset compensating section that performs the offset compensation of the DC level difference of the output of said preamplifier, said first level comparison circuit constitutes an amplitude limit amplifier section that compares and amplifies the output of said offset compensating section, and said second level comparison circuit and said adder circuit constitute a DC level reproducing section that compensates for fluctuations in the outputs of the first and second level sensing circuits.

13. A digital signal receiver circuit according to claim 12, wherein said offset compensating section further includes reset means for resetting said first and second level sensing circuits.

14. A digital signal receiver circuit according to claim 13, wherein said reset means resets said first and second level sensing circuits with the timing of each input signal.

15. A digital signal receiver circuit according to claim 12, wherein said amplitude limit amplifier section and said DC level reproducing section include:

a first and second transistors that use the outputs of said first and second differential circuits as their base inputs, respectively;

a first and second emitter resistors which have the same resistance value and one end of each of which is connected to the emitter of each of said first and second transistors, respectively;

a first current source connected to the other end of each of said first and second emitter resistors;

a third and fourth transistors that use the outputs of said first and second level sensing circuits as their base inputs, respectively;

a third and fourth emitter resistors which have the same resistance value as that of said first and second emitter resistors and one end of each of which is connected to the emitter of each of said third and fourth transistors, respectively;

a second current source connected to the other end of each of said third and fourth emitter resistors;

a first collector resistor one end of which is connected to the collector of said first transistor and the collector of said third transistor and the other end of which is applied with a power supply voltage; and a second collector resistor which has the same resistance value as that of said first collector resistor and one end of which is connected to the collector of said second transistor and the collector of said fourth transistor and the other end of which is applied with said power supply voltage, wherein the collector combined output of said first and third transistors and the collector combined output of said second and fourth transistors are determined to be reception outputs.

16. A digital signal receiver circuit according to claim 12, wherein said first and second differential circuits include:

a fifth and sixth transistors that use the positive phase output of said preamplifier and the output of said first level sensing circuit as their base inputs, respectively;

a fifth and sixth emitter resistors which have the same resistance value and one end of each of which is connected to the emitter of each of said fifth and sixth transistors, respectively;

a third current source connected to the other end of each of said fifth and sixth emitter resistors;

a seventh and eighth transistors that use the output of said second level sensing circuit and the opposite phase output of said preamplifier as their base inputs, respectively;

a seventh and eighth emitter resistors which have the same resistance value as that of said fifth and sixth emitter resistors and one end of each of which is connected to the emitter of each of said seventh and eighth transistors, respectively;

a fourth current source connected to the other end of each of said seventh and eighth emitter resistors;

a third collector resistor one end of which is connected to the collector of said fifth transistor and the collector of said seventh transistor and the other end of which is applied with a power supply voltage; and a fourth collector resistor which has the same resistance value as that of said third collector resistor and one end of which is connected to the collector of said sixth transistor and the collector of said eighth transistor and the other end of which is applied with said power supply voltage, wherein the collector combined output of said fifth and seventh transistors and the collector combined output of said sixth and eighth transistors are determined to be the outputs of said first and second differential circuits, respectively.

17. A digital signal receiver circuit according to claim 12, wherein more sets of said offset compensating section, amplitude limit amplifier section, and DC level reproducing section are repeated in the form of multistage connection.

18. A digital signal receiver circuit according to claim 12, wherein said DC level reproducing section includes a third differential circuit that has the same gain as that of said first or second differential circuit and that determines the difference between the outputs of said first and second level sensing circuits and outputs the positive phase signal and opposite phase signal, and said second level comparison circuit has the same gain as that of said first level comparison circuit and compares the positive phase signal and opposite phase signal outputted from said third differential circuit.

19. A digital signal receiver circuit according to claim 12, wherein said input digital signal is a photoelectric current produced by a light-receiving element.

20. A digital signal receiver circuit comprising:

a preamplifier for generating a positive phase signal and the opposite phase signal from an input digital signal;

a first level sensing circuit for sensing and holding either the peak value or the bottom value of the positive phase output of said preamplifier;

a second level sensing circuit for sensing and holding the same level value as that of said first level sensing circuit from the peak value or bottom value of the opposite phase output of said preamplifier;

a first differential circuit that determines the difference between the positive phase output and opposite phase output of said preamplifier and outputs the difference;

a second differential circuit that has the same gain as that of said first differential circuit and that determines the difference between the outputs of said first and second level sensing circuits and outputs the difference;

a first level comparison circuit that compares the output of said first differential circuit with the output of said second differential circuit and outputs a signal voltage with a constant amplitude within a specific input voltage amplitude range;

a second level comparison circuit that has the gain equal to the product of the gain of said first or second differential circuit and the gain of said first level comparison circuit and that compares the output of said first level sensing circuit with the output of said second level sensing circuit and outputs a signal voltage with a constant amplitude within a specific input voltage amplitude range; and an adder circuit that adds the output of said first level comparison circuit to the output of said second level comparison circuit, wherein said first and second level sensing circuits, first and second differential circuits, and first level comparison circuit constitute an offset compensating section that performs the offset compensation of the DC level difference of the output of said preamplifier, said first level comparison circuit constitutes an amplitude limit amplifier section that compares and amplifies the output of said offset compensating section, and said second level comparison circuit and said adder circuit constitute a DC level reproducing section that compensates for fluctuations in the outputs of the first and second level sensing circuits.

21. A digital signal receiver circuit according to claim 20, wherein said offset compensating section further includes reset means for resetting said first and second level sensing circuits.

22. A digital signal receiver circuit according to claim 21, wherein said reset means resets said first and second level sensing circuits with the timing of each input signal.

23. A digital signal receiver circuit according to claim 20, wherein said amplitude limit amplifier section and said DC level reproducing section include:

a first and second transistors that use the outputs of said first and second differential circuits as their base inputs, respectively;

a first and second emitter resistors which have the same resistance value and one end of each of which is connected to the emitter of each of said first and second transistors, respectively;

a first current source connected to the other end of each of said first and second emitter resistors;

a third and fourth transistors that use the outputs of said first and second level sensing circuits as their base inputs, respectively;

a third and fourth emitter resistors which have the same resistance value as that of said first and second emitter resistors and one end of each of which is connected to the emitter of each of said third and fourth transistors, respectively;

a second current source connected to the other end of each of said third and fourth emitter resistors;

a first collector resistor one end of which is connected to the collector of said first transistor and the collector of said third transistor and the other end of which is applied with a power supply voltage; and a second collector resistor which has the same resistance value as that of said first collector resistor and one end of which is connected to the collector of said second transistor and the collector of said fourth transistor and the other end of which is applied with said power supply voltage, wherein the collector combined output of said first and third transistors and the collector combined output of said second and fourth transistors are determined to be reception outputs.

24. A digital signal receiver circuit according to claim 20, wherein said first and second differential circuits include:

a fifth and sixth transistors that use the positive phase output and opposite phase output of said preamplifier as their base inputs, respectively;

a fifth and sixth emitter resistors which have the same resistance value and one end of each of which is connected to the emitter of each of said fifth and sixth transistors, respectively;

a third current source connected to the other end of each of said fifth and sixth emitter resistors;

a seventh and eighth transistors that use the outputs of said first and second level sensing circuits as their base inputs, respectively;

a seventh and eighth emitter resistors which have the same resistance value as that of said fifth and sixth emitter resistors and one end of each of which is connected to the emitter of each of said seventh and eighth transistors, respectively;

a fourth current source connected to the other end of each of said seventh and eighth emitter resistors;

a third collector resistor one end of which is connected to the collector of said fifth transistor and the collector of said seventh transistor and the other end of which is applied with a power supply voltage; and a fourth collector resistor which has the same resistance value as that of said third collector resistor and one end of which is connected to the collector of said sixth transistor and the collector of said eighth transistor and the other end of which is applied with said power supply voltage, wherein the collector combined output of said fifth and seventh transistors and the collector combined output of said sixth and eighth transistors are determined to be the outputs of said first and second differential circuits, respectively.

25. A digital signal receiver circuit according to claim 20, wherein more sets of said offset compensating section, amplitude limit amplifier section, and DC level reproducing section are repeated in the form of multistage connection.

26. A digital signal receiver circuit according to claim 20, wherein said DC level reproducing section includes a third differential circuit that has the same gain as that of said first or second differential circuit and that determines the difference between the outputs of said first and second level sensing circuits and outputs the positive phase signal and opposite phase signal, and said second level comparison circuit has the same gain as that of said first level comparison circuit and compares the positive phase signal and opposite phase signal outputted from said third differential circuit.

27. A digital signal receiver circuit according to claim 20, wherein said input digital signal is a photoelectric current produced by a light-receiving element.

28. A digital signal receiver circuit comprising:

a preamplifier for generating a positive phase signal and the opposite phase signal from an input digital signal;

a first level sensing circuit for sensing and holding either the peak value or the bottom value of the positive phase output of said preamplifier;

a second level sensing circuit for sensing and holding the same level value as that of said first level sensing circuit from the peak value or bottom value of the opposite phase output of said preamplifier;

a first differential circuit that determines the difference between the positive phase output and opposite phase output of said preamplifier and outputs at least the positive phase signal;

a second differential circuit that has the same gain as that of said first differential circuit and that determines the difference between the output of said first level sensing circuits and the output of said second level sensing circuit and outputs the positive phase signal and opposite phase signal;

a first level comparison circuit that compares the positive phase output of said first differential circuit with the positive phase output of said second differential circuit and outputs a signal voltage with a constant amplitude within a specific input voltage amplitude range;

a second level comparison circuit that has the same gain as that of said first level comparison circuit and that compares the positive phase output and opposite phase output of said second differential circuit and outputs a signal voltage with a constant amplitude within a specific input voltage amplitude range; and an adder circuit that adds the output of said first level comparison circuit to the output of said second level comparison circuit, wherein said first and second level sensing circuits and first and second differential circuits constitute an identification level sensing section that senses the identification level of the output of said first differential circuit, said first level comparison circuit constitutes an amplitude limit amplifier section that compares and amplifies the output of said identification level sensing section, and said second level comparison circuit and said adder circuit constitutes a DC level reproducing section that compensates for fluctuations in the outputs of the first and second level sensing circuits.

29. A digital signal receiver circuit according to claim 28, wherein said identification level sensing section further includes reset means for resetting said first and second level sensing circuits.

30. A digital signal receiver circuit according to claim 29, wherein said reset means resets said first and second level sensing circuits with the timing of each input signal.

31. A digital signal receiver circuit according to claim 28, wherein more sets of said identification level sensing section, amplitude limit amplifier section, and DC level reproducing section are repeated in the form of multistage connection.

32. A digital signal receiver circuit according to claim 28, wherein said DC level reproducing section includes a third differential circuit that has the same gain as that of said first or second differential circuit and that determines the difference between the outputs of said first and second level sensing circuits and outputs the positive phase signal and opposite phase signal, and said second level comparison circuit has the same gain as that of said first level comparison circuit and compares the positive phase signal and opposite phase signal outputted from said third differential circuit.

33. A digital signal receiver circuit according to claim 28, wherein said input digital signal is a photoelectric current produced by a light-receiving element.

* * * * *